US010685407B1

(12) United States Patent
Cabrera et al.

(10) Patent No.: US 10,685,407 B1
(45) Date of Patent: Jun. 16, 2020

(54) COMPUTER-IMPLEMENTED METHODS, SYSTEMS AND ARTICLES OF MANUFACTURE FOR TAX TOPIC PREDICTION UTILIZING PRIOR TAX RETURNS

(71) Applicant: Intuit Inc., Mountain View, CA (US)

(72) Inventors: Luis F. Cabrera, Bellevue, WA (US); Gang Wang, San Diego, CA (US); Kevin M. McCluskey, Carlsbad, CA (US); Kyle J. Ryan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 644 days.

(21) Appl. No.: 14/700,981

(22) Filed: Apr. 30, 2015

(51) Int. Cl.
*G06Q 40/00* (2012.01)
(52) U.S. Cl.
CPC .................... *G06Q 40/123* (2013.12)
(58) Field of Classification Search
None
See application file for complete search history.

(56) References Cited

U.S. PATENT DOCUMENTS

| 4,213,251 | A | 7/1980 | Foundos |
| 4,809,219 | A | 2/1989 | Ashford et al. |
| 5,006,998 | A | 4/1991 | Yasunobu |
| 5,495,607 | A | 2/1996 | Pisello et al. |
| 5,557,761 | A | 9/1996 | Chan et al. |
| 5,673,369 | A | 9/1997 | Kim |
| 5,742,836 | A | 4/1998 | Turpin et al. |
| 5,819,249 | A | 10/1998 | Dohanich |
| 6,078,898 | A | 6/2000 | Davis |
| 6,535,883 | B1 | 3/2003 | Lee et al. |
| 6,601,055 | B1 | 7/2003 | Roberts |

(Continued)

FOREIGN PATENT DOCUMENTS

| JP | 2002-117121 A | 4/2002 |
| JP | 2005-190425 A | 7/2005 |

(Continued)

OTHER PUBLICATIONS

Office Action dated Nov. 17, 2016 in U.S. Appl. No. 14/448,922, filed Jul. 31, 2014, inventor: Gang Wang.

(Continued)

*Primary Examiner* — Christopher Bridges
(74) *Attorney, Agent, or Firm* — DLA Piper LLP (US)

(57) ABSTRACT

Computer-implemented methods, systems and articles of manufacture for determining which questions to present to a user of a modular tax preparation application in which analysis of tax logic by the tax logic agent is separate from interview screens generated by the user interface controller. A topic engine of the modular tax preparation application is configured or programmed to predict which tax topics are applicable to the current electronic tax return based at least in part upon a data of a prior year tax return. Other sources besides the current tax return being prepared and the prior year tax return may also be utilized for topic determination. The tax logic agent generates a non-binding suggestion for the user interface controller based at least in part upon an output generated by the topic engine.

37 Claims, 21 Drawing Sheets

(56) References Cited

U.S. PATENT DOCUMENTS

| | | |
|---|---|---|
| 6,631,361 B1 | 10/2003 | O'Flaherty et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1* | 5/2009 | Peak ............... G06Q 10/00 705/31 |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1* | 12/2010 | Quinn ............... G06F 40/174 705/31 |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1* | 12/2011 | Brown ............... G06F 40/174 704/9 |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1* | 3/2013 | Eftekhari ............. G06Q 40/123 705/31 |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2* | 3/2014 | Barthel ............... G06Q 10/10 705/19 |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 2002/0065831 A1 | 5/2002 | DePaolo |
| 2002/0107698 A1 | 8/2002 | Brown et al. |
| 2002/0111888 A1 | 8/2002 | Stanley |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0078271 A1 | 4/2004 | Marano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0205008 A1 | 10/2004 | Haynie et al. |
| 2005/0171822 A1 | 8/2005 | Cagan |
| 2005/0216379 A1 | 9/2005 | Ozaki |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1* | 8/2006 | Stanley ............... G06Q 40/02 705/31 |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1* | 4/2007 | Yu ............... G06Q 10/10 706/47 |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1* | 6/2008 | Larson ............... G06Q 30/0234 705/14.34 |
| 2008/0162310 A1 | 7/2008 | Quinn |
| 2008/0177631 A1 | 7/2008 | William |
| 2008/0215392 A1 | 9/2008 | Rajan |
| 2008/0243531 A1* | 10/2008 | Hyder ............... G06Q 30/02 705/1.1 |
| 2009/0024694 A1 | 1/2009 | Fong |
| 2009/0037305 A1 | 2/2009 | Sander |
| 2009/0048957 A1 | 2/2009 | Celano |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0131394 A1 | 5/2010 | Rutsch et al. |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258610 A1 | 10/2011 | Aaraj et al. |
| 2011/0264569 A1* | 10/2011 | Houseworth ............ G06Q 10/10 705/31 |
| 2012/0016817 A1* | 1/2012 | Smith ............... G06N 99/005 706/12 |

(56) References Cited

U.S. PATENT DOCUMENTS

| | | |
|---|---|---|
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari .......... G06F 21/31 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1* | 3/2013 | Allanson .......... G06Q 40/02 705/31 |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1* | 7/2014 | Aldrich .......... G06Q 30/018 705/31 |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1* | 3/2016 | Roebuck .......... G06Q 40/123 705/31 |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |

OTHER PUBLICATIONS

Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.

(56) References Cited

OTHER PUBLICATIONS http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports-graphs-and-snapshots/track-the-earnings-taxes-deductions-or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).

(56) References Cited

OTHER PUBLICATIONS

Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Vanderbilt University, "Free tax prep help available for Vanderbilt employees", Feb. 6, 2014, Vanderbilt University, p. 1-3.
Office Action dated Aug. 25, 2017 in U.S. Appl. No. 14/673,555, (65pgs.).
Office Action dated Sep. 28, 2017 in U.S. Appl. No. 14/701,149, (71pgs.).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).

(56) References Cited

OTHER PUBLICATIONS

Response dated Sep. 21, 2017 in U.S. Appl. No. 14/448,481, (44pages).
Office Action dated Sep. 14, 2017 in U.S. Appl. No. 14/530,159, (41pages).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appli. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).

* cited by examiner

|  | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 6A

|   | A | B | C | D | E | F | G | Goal |
|---|---|---|---|---|---|---|---|------|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | N | ? | N | N | N | ? | Yes |
| R5 | N | ? | ? | ? | ? | ? | ? | Yes |

(Rows) (Rules 461)

Columns (Questions 462)

Cross Out Since Answer to Question A is "yes" 1010

COMPUTER-IMPLEMENTED METHODS, SYSTEMS AND ARTICLES OF MANUFACTURE FOR TAX TOPIC PREDICTION UTILIZING PRIOR TAX RETURNS

SUMMARY

Certain embodiments are related to a tax preparation system comprising modular components structured such that logic analysis is separate from interview screens and user interface functions. The system accesses a prior year tax return and identifies questions or topics (generally, questions) for a current tax return being prepared based at least in part upon a prior year tax return. Embodiments enhance the tax return preparation experience by providing more personalized and comprehensive tax preparation experience.

Certain embodiments involve identifying questions for a current tax return being prepared based at least in part upon a combination of a prior year tax return and other or secondary data or data from another source. The secondary data may be one or more of statistics of other taxpayers that share certain attributes as a current taxpayer, predictive model outputs, analysis of transaction data of an account a taxpayer has with a financial management system, and analysis of an account the taxpayer has with a financial institution.

Certain embodiments involve tax topic prediction and identifying questions or topics for a current tax return that were not addressed in a prior year tax return.

Certain embodiments involve a modular tax preparation system that includes a tax logic agent that performs logic computations, a user interface controller, a calculation engine that performs calculation computations, and a data store shared by these components. With these separate components, tax logic is separated or divorced from user interface functions such that, for example, tax logic is not programmed within an interview screen as is the case with various known tax preparation applications. User interface components of embodiments are independent of tax logic agent actions in that when processing a non-binding suggestion (e.g., according to a configuration file), the UI controller may determine whether and/or when (e.g., now, at a later time, upon receipt of other data, or at the end during final review) a non-binding suggestion is processed.

Calculation engine components of embodiments can generate a result of executing the calculation to the shared data store to update the runtime data and write the calculated result to a shared data store and populate a graphical data structure with the data, such as populating nodes of a calculation graph including input or leaf nodes, function nodes and result nodes. This data is read by the tax logic agent. Thus, the UI controller, calculation engine and tax logic agent can perform their respective processing as runtime data is updated, received, or corrected.

One embodiment is directed to a modular tax preparation system including a user interface controller, a tax logic agent in communication with the user interface controller, a topic engine and a data store in which analysis of tax logic by the tax logic agent is separate from or independent of interview screens generated by the user interface controller, which is configured or programmed to present interview screens to a user of the computerized tax preparation system. The topic engine configured or programmed to receive data of a prior year tax return and predict which tax topics are applicable to the current electronic tax return. The user interface controller is configured or programmed to present interview screens to a user of the computerized tax preparation system and is in communication with the tax logic agent, but analysis of tax logic by the tax logic agent is separate from or independent of user interface functions and interview screens generated by the user interface controller. The topic engine is configured or programmed to predict which tax topics are applicable to the current electronic tax return based at least in part upon data provided by different first and second sources. A first source is, or provides, a prior year tax return of the taxpayer, and the second source is a source other than the current and prior tax returns. The user interface controller and the tax logic agent share the data store such that the user interface controller can write data to the shared data store to update runtime data of the current electronic tax return. The tax logic agent can read runtime data from the shared data store and generate a non-binding suggestion for the user interface controller. The non-binding suggestion is based at least in part upon an output generated by the topic engine, which may identify topics or questions of one or more prior year tax returns and may also identify other topics or questions that were not addressed in a prior year tax return.

System embodiments may involve a topic engine being a component of the tax logic agent, and in other embodiments, is a component of, or utilized by, the user interface controller. In these embodiments, the user interface controller may tag associated data such that when the data is read by the tax logic agent, the tax logic agent is aware of the source of the data, and topic engine processing or outputs, and can generate a non-binding suggestion based thereon.

Embodiments are also directed to computer-implemented methods involving system components. Aspects of methods may be executed by different computing devices that may be execute on a taxpayer's or preparer's computing device or different modular components may execute on different computing devices and be in communication with each other through respective networks.

Yet other embodiments are directed to articles of manufacture or computer program products comprising a non-transitory computer readable storage medium embodying one or more instructions executable by one or more computers (e.g., via respective networks for distributed or modular tax preparation systems and remote system components) to implement method embodiments and that may be utilized by various modular system components.

In a single or multiple embodiments involving multiple sources, a first source may be a computing device utilized by the taxpayer or preparer of the current electronic tax return. An electronic file of a prior year tax return may be locally stored on such computing devices, on portable media, or in an electronic mail file or directory. Other embodiments may involve prior year tax returns retrieved from a computer of a tax authority or from a prior year tax preparation application. In cases in which the taxpayer utilized a tax preparation application of another manufacturer for the prior year tax return (e.g., taxpayer is currently using TURBOTAX tax preparation application available from Intuit Inc. for the current electronic tax return and previously used H&R BLOCK tax preparation application for the prior year), the topic engine may access the prior year return prepared by another tax preparation utilizing credentials of that other tax preparation application provided by taxpayer.

In a single or multiple embodiments involving multiple sources, a second source may be a source of statistical data or a predictive model or predictive model library. The topic engine may identify topics addressed in the prior year tax return, and identify additional possible topics that were not included in the prior year tax return based at least in part upon statistical data and/or predictive models associated with one or more identified topics of the prior year tax return. In the event that additional possible topics are not relevant to the taxpayer, embodiments nevertheless provide a more personalized and comprehensive tax preparation experience.

Non-binding suggestions generated by the tax logic agent and provided to the user interface controller may be based on the tax logic agent's analysis of runtime data and tax logic and/or outputs generated by topic engine, which may involve one or more determined or predicted tax topics. A non-binding suggestion may involve a topic or tax form that was not addressed in the prior year tax return.

In a single or multiple embodiments, a non-binding suggestion generated based at least in part upon the topic engine output may indicate that the taxpayer may have experienced a life event that occurred during a current tax year, but not during the prior year (as reflected in the absence of questions concerning the life event in the prior year tax return). For example, when a second source of an account the taxpayer has with a financial institution or a financial management system is utilized, the topic engine can analyze electronic transaction data or other financial information and identify the taxpayer life event based on account activities or transaction data. Activities or transaction data may be indicate purchases made from a certain merchant or purchasing certain items. Further, statistical data and/or predictive models may be utilized to predict whether the taxpayer may have experienced a life event. For example, a tax topic identified by the topic engine output may involve whether the taxpayer had a baby, whereas the prior year tax return had no such topics or associated deductions. Continuing this example, if the prior year tax return, which did not involve "baby-related" tax matters, was a joint tax return or involved taxpayers that were married, a "baby-related" tax topic may be identified by the topic engine as a predicted relevant topic based at least in part upon the prior year tax return being a joint tax return and the taxpayers being married, and of a certain age, in view of statistical data or predictive model outputs concerning other taxpayers with similar attributes. As a further example, the topic engine may identify a "home" related tax topic such as deductions for mortgage interest, points and property taxes associated with owning or purchasing of a property, whereas the prior year tax return was a joint tax return and indicated no property ownership.

In a single or multiple embodiments, the prior year tax return that is utilized by the topic engine may be a prior return tax return that was actually filed with a tax authority, or one that was not filed (e.g., an earlier saved version, or a tax return that was started but not completed and thus is incomplete). Give that embodiments are not analyzing specific data values and instead focus on topical subject matter, partially completed or incomplete returns can also be analyzed by topic engine.

In a single or multiple embodiments, when multiple prior year tax returns are considered for analysis by topic engine, selection of prior year tax returns may depend on certain selection criteria, such as prior year tax returns must be consecutive prior year returns and/or include a most recent prior year return.

BRIEF DESCRIPTION OF THE DRAWINGS

FIG. 6A illustrates a decision table based on or derived from a completeness graph of FIG. 5C, FIG. 6C illustrates an example of how a rule engine may process a decision table when determining which question to select;

DETAILED DESCRIPTION OF ILLUSTRATED EMBODIMENTS

Embodiments involve computerized systems, computer-implemented methods, and articles of manufacture or computer program products for identifying topics questions or topics (generally, questions) for a current tax return being prepared based at least in part upon a prior year tax return in order to enhance the tax return preparation experience by providing more personalized questions and comprehensive tax preparation experience. Embodiments may also involve receiving prior year tax returns for multiple years and determining how tax returns of different prior years are processed and which questions thereof are selected for consideration in a current tax return being prepared. Given that embodiments involve question or topic identification, as opposed to, for example, the specific personal or numerical data of a prior year return, embodiments may utilize tax returns in various forms and stages of preparation including paper and electronic prior year tax returns, prior year tax returns that were not filed or drafts thereof, and even incomplete prior year tax returns.

Embodiments may involve analysis of multiple prior year returns, and one or more prior year tax returns in conjunction with one or more other secondary sources such as statistical data of other taxpayers having attributes that are the same as or similar to the current taxpayer and predictive models for topic derivation or prediction. Embodiments may derive or predict questions that were not included in a prior year tax return based on prior purchase or transaction data, which may involve certain merchants or purchase of specific items or categories of items (e.g., indicating that taxpayers had a baby based on purchase of a crib and diapers or other baby products, or certain business expenses/deductions due to purchase of new computers, telephones and other equipment).

Embodiments are particularly useful when no prior tax return data or limited data is available about a user or taxpayer. For example, embodiments can be utilized to access one or more sources to obtain prior year tax returns, and this data is used to seed selection of tax topics while providing a meaningful and personalized starting point and tax preparation experience by determining potential additional topics or questions may be relevant to the user given the limited available data that is available about the taxpayers. Further aspects of embodiments are described with reference to FIGS. 1-17.

Figure 1:
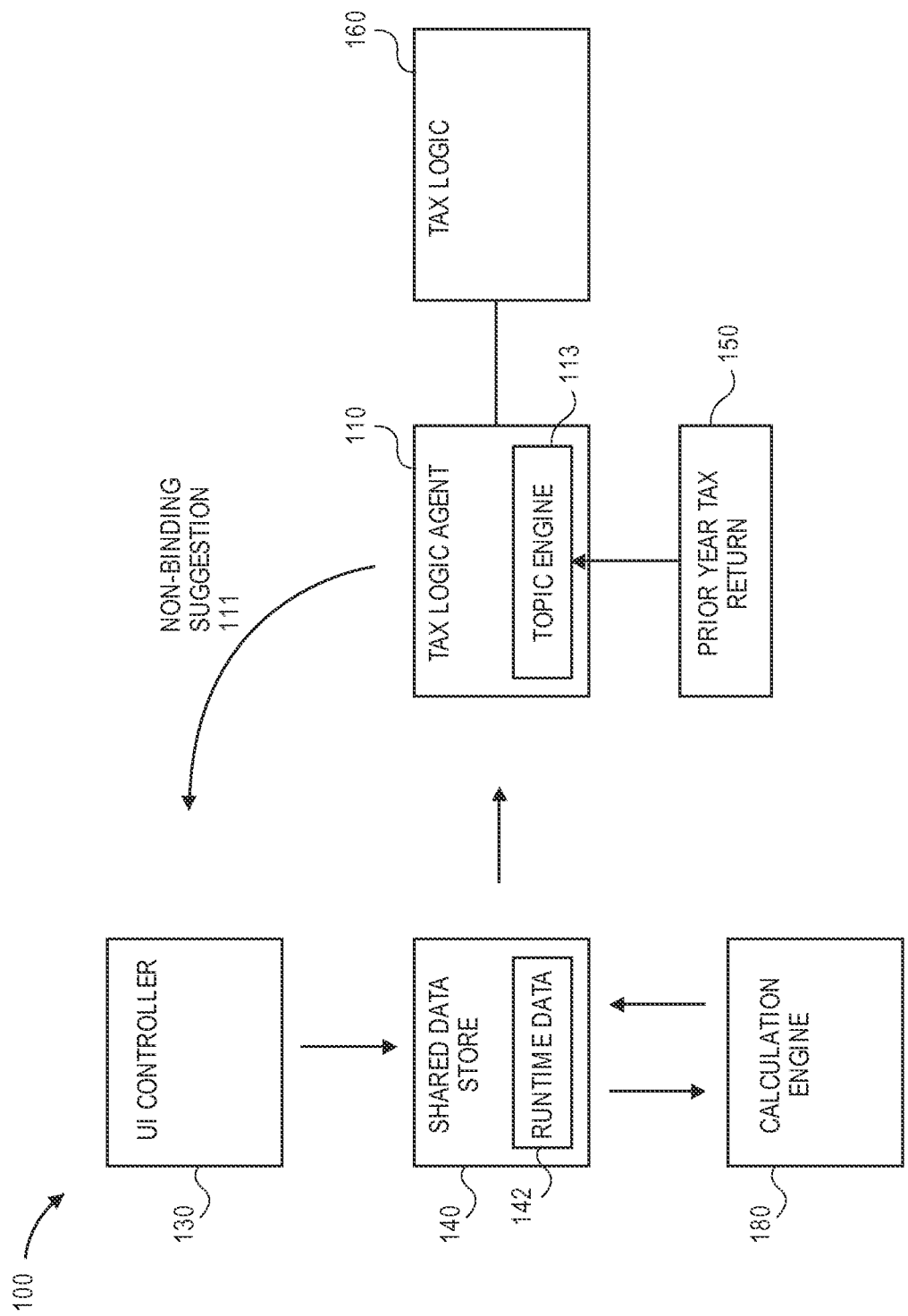
FIG. 1 is a system flow diagram illustrating how embodiments of a modular tax preparation system including a topic engine that is a component or utilized by a tax logic agent and how the topic engine utilizes prior year tax returns to identify potential topics or questions for a current tax return.

Referring to FIG. 1, a computerized, a modular tax preparation system 100 constructed according to one embodiment includes or involves a tax logic agent (TLA) 110 that utilizes tax logic 160 expressed in a decision table or completeness graph, a user interface (UI) controller 130, a calculation engine 180, and a data store 140 shared by TLA 110, UI controller 130 and calculation engine 180.

Embodiments also include a topic engine 113 which, in the illustrated embodiment, is a component of or utilized by TLA 110. Topic engine 113 identifies and predicts tax topics that may be pertinent to a current electronic tax return being prepared based at least in part upon one or more prior year tax returns 150, which may be a prior year tax return that was filed with a tax authority, a version that was prepared but not filed, an tax return that was partially completed or is incomplete.

With the modular tax preparation system 100 shown in FIG. 1, the tax logic 160 and TLA 110 determinations regarding questions to be presented to a user are separate from or independent of UI functions and interview screens generated by UI controller 130. In other words, these components are loosely connected to each other, or divorced from each other, such that outputs of TLA 110 regarding possible questions to present to the user are in the form of "non-binding" suggestions 111 to UI controller 130. Thus, TLA 110 does not control or dictate what UI controller 130 presents to user. Instead, UI controller 130 determines whether/when to process non-binding suggestions 111. With this distributed, modular system configuration, TLA 110, by use of special purpose topic engine 113, is configured or programmed to receive data of a prior year tax return 150 and predict which tax topics are applicable to the current electronic tax return currently being prepared based at least in part upon the prior year tax return 150 data. Questions determined by topic engine 113 are provided to TLA 110, which generates one or more non-binding suggestions 111 involving topic engine 113 output for UI controller 130, and UI controller 130 determines how non-binding suggestion(s) 111 are processed and presents an interview screen to user as appropriate. When UI controller 130 receives a response from user, UI controller 130 writes response data to shared data store 140. Calculation engine 180 reads runtime data 142 including any responses written by UI controller 130 and performs one or more calculations involving such data and writes results back to shared data store 140. TLA 110 can read runtime data 142 including any such updates by UI controller 130 and calculation engine 180. This processing is repeated until a state of completeness of a topic or the electronic tax return is in condition for filing with a tax authority.

Figure 2:
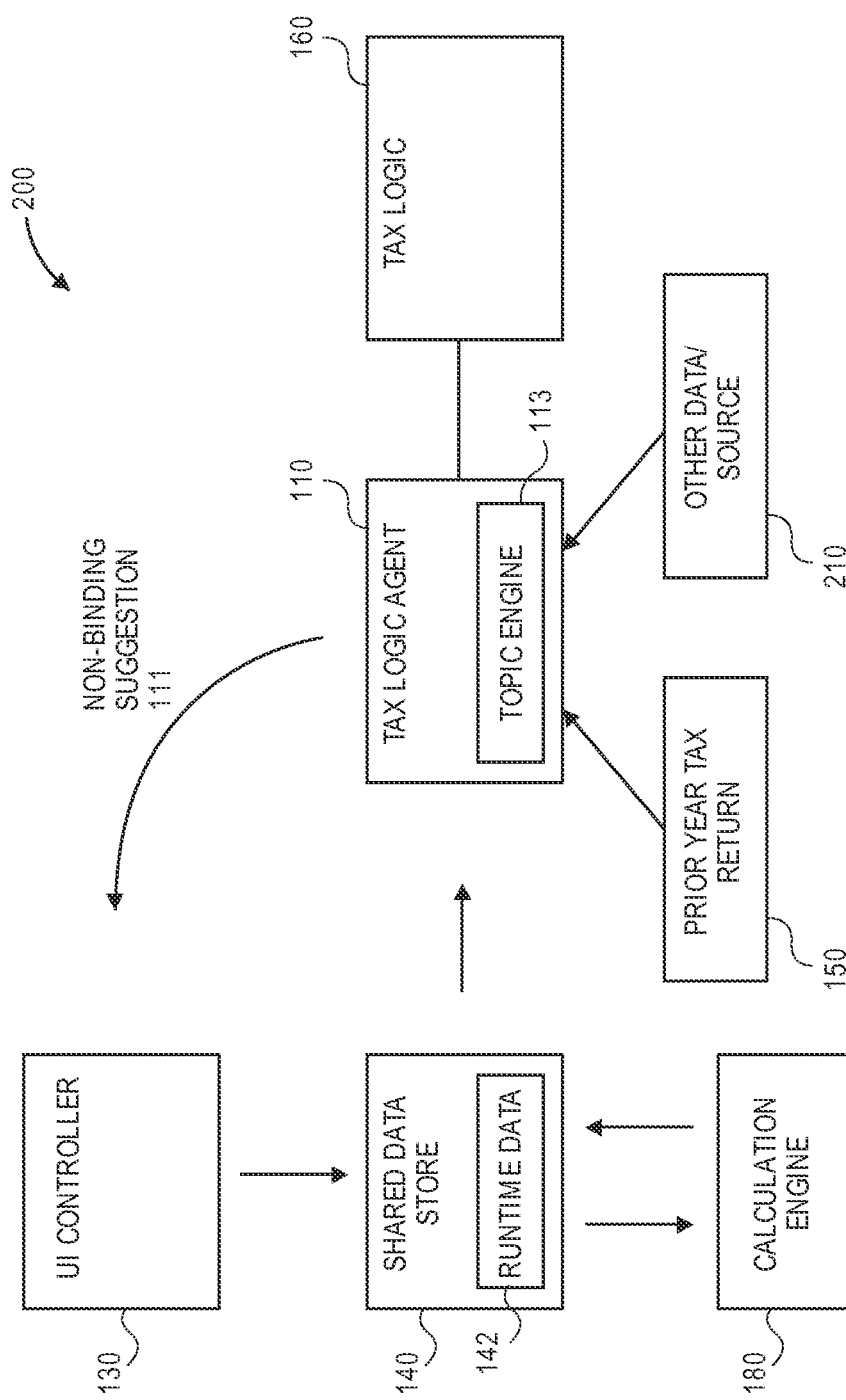
FIG. 2 is a system flow diagram illustrating how embodiments of a modular tax preparation system including a topic engine that is a component or utilized by a tax logic agent and how the topic engine utilizes prior year tax returns and at least one other type of data or data source to identify potential topics or questions for a current tax return.

Referring to FIG. 2, in a system 200 constructed according to another embodiment, multiple sources of data are utilized for tax topic identification/prediction. In the illustrated embodiment, system 200 includes components of FIG. 1 described above, and topic engine 113 receives data of a prior year tax return 150 from a first source and also receives other data 210 from a different, secondary source. While FIG. 2 illustrates two sources or two different types of data, it will be understood in view of the following detailed description of embodiments, that embodiments may involve various number and types of sources and that topic engine 113 can process different types of data from these different numbers and types of data sources to determine potential questions that may be pertinent to the current electronic tax return being prepared.

With the system configuration shown in FIG. 2, topic engine 113 determines which questions may be applicable to the current electronic tax return based at least in part upon data of a prior year tax return 150 received from a first source as well as other data 210 of a second source different than the first source. TLA 110 generates non-binding suggestion 111 for UI controller 130 based at least in part upon an output generated by the topic engine 113.

Figure 3:
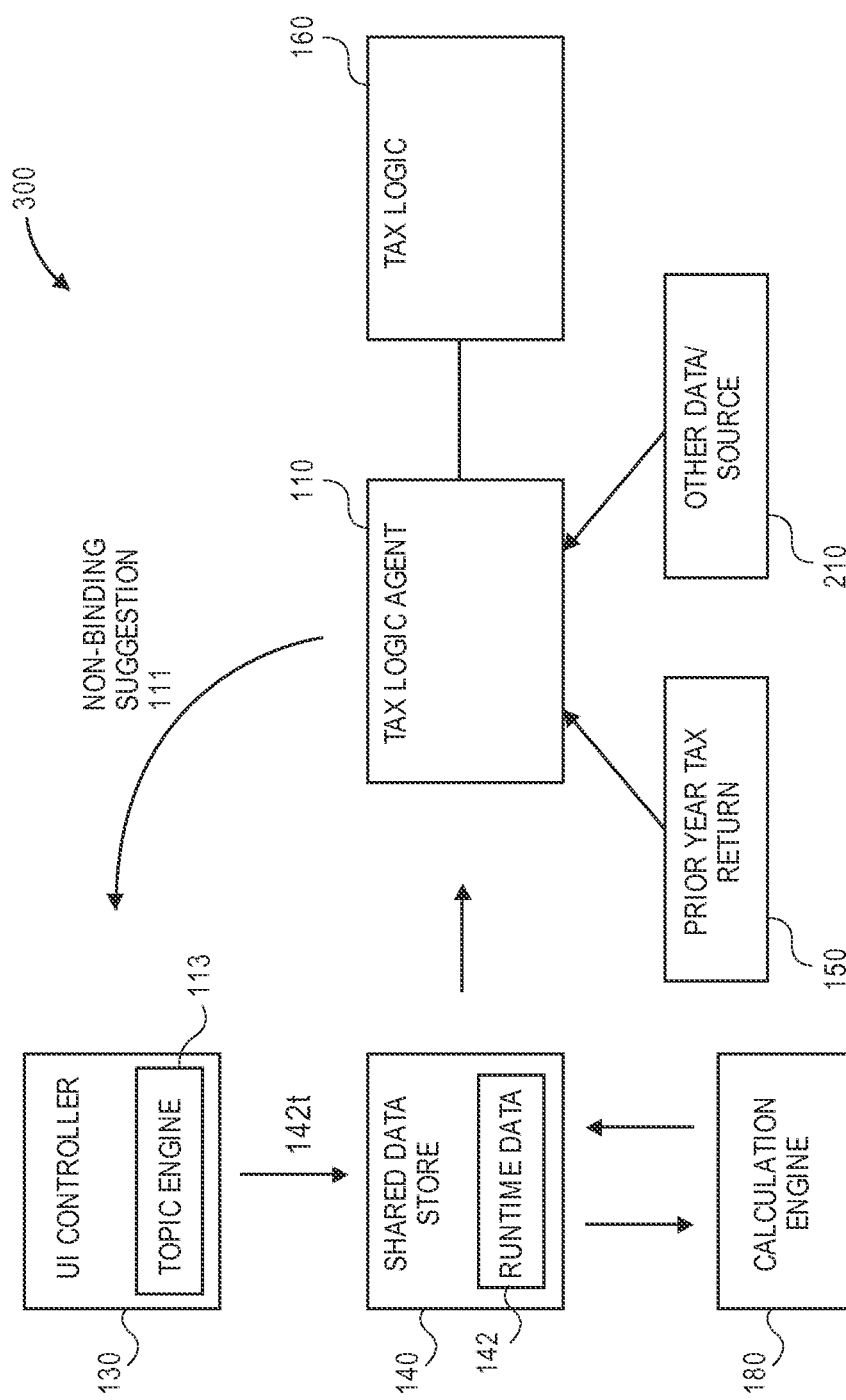
FIG. 3 is a system flow diagram illustrating how embodiments of a modular tax preparation system including a topic engine that is a component or utilized by a user interface controller.

While FIGS. 1-2 generally illustrate system 100, 200 embodiments in which topic engine 113 is a component of or utilized by TLA 110, in another system 300 embodiment as shown in FIG. 3, topic engine 113 is a component of or utilized by UI controller 130. In one implementation of such embodiments, UI controller 130 may receive data manually entered by a user and from various electronic sources. Topic engine 113 related data may be stored by UI controller 130 to shared data store 140, and then read by TLA 110 for processing and generation of a non-binding suggestion 111 based on topic engine 113 output, e.g., if UI controller 130 does not address topic engine 113 output "on the spot" and instead waits for TLA 110 to read from shared data store 140 and address it in the form of a non-binding suggestion 111 involving topic engine 113 output. For this purpose, UI controller 130 can write data utilized by, or an output generated by topic engine 113, to shared data store 140 with a corresponding tag or identifier 142t. In this manner, when data is read by calculation engine 180 and TLA 110, these system components know the origin of the data, and TLA 110 can utilize tagged data 142t when generating non-binding suggestions 111 and may be used when prioritizing non-binding suggestions 111 for consideration by UI controller 130. Further details regarding embodiments and aspects of embodiments are described with reference to FIGS. 4-25, and FIGS. 4-10 illustrate one embodiment of a modular tax preparation system 400 in which tax logic is separate or independent of user interface functions such that these components are loosely connected or divorced from each other, and FIGS. 11-25 illustrate further aspects of how embodiments may be implementing with systems and processing described with reference to FIGS. 4-10.

Figure 4:
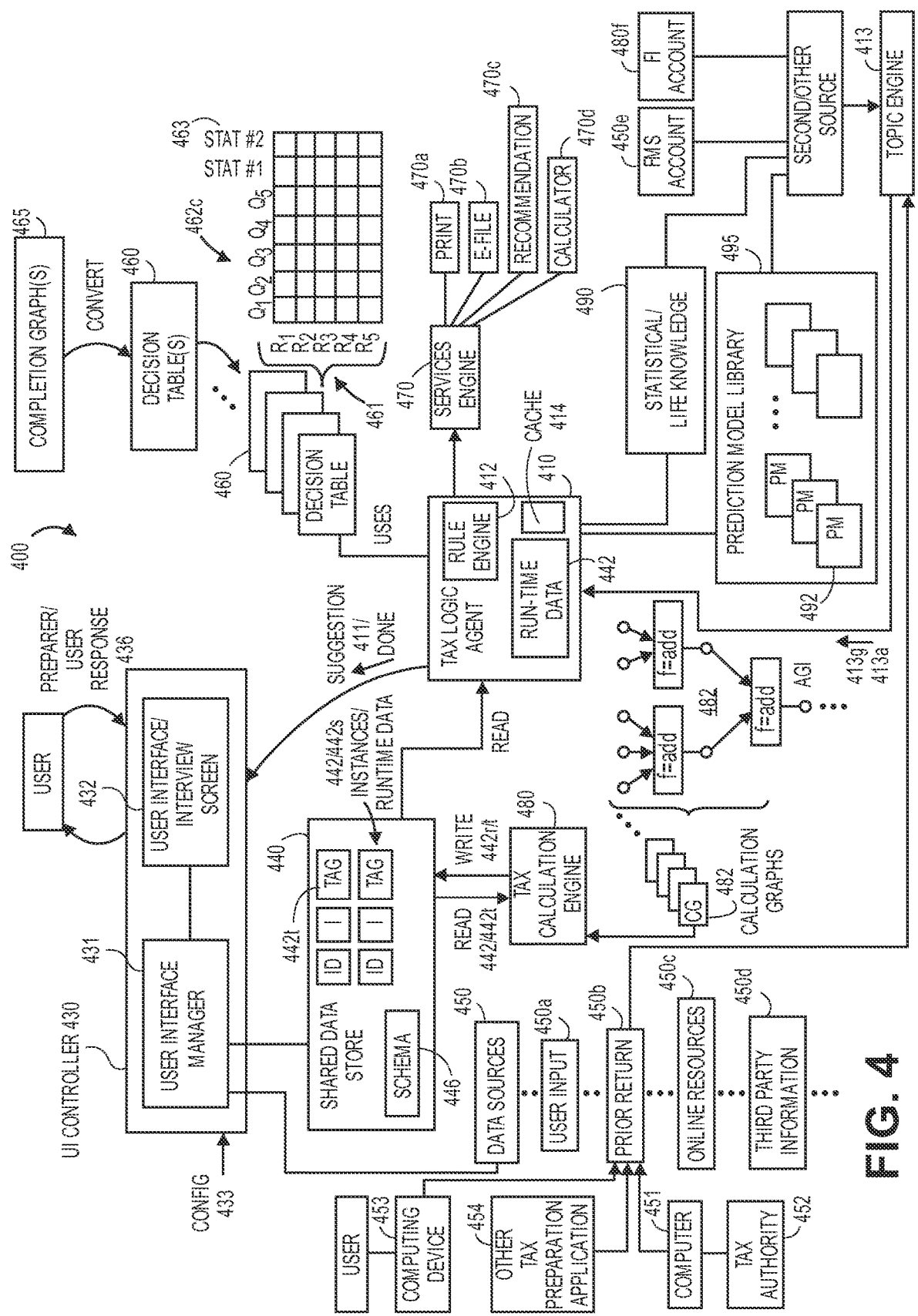
FIG. 4 illustrates a block diagram of a computerized modular tax preparation system constructed according to one embodiment and illustrating system components and associated graph data structures and decision tables and how such system is configured for identifying and predicting electronic tax return topics.

FIG. 4 illustrates one embodiment of a modular tax preparation system 400 incorporating special purpose topic engine 413. According to one embodiment and as illustrated, topic engine 314 is a component of, or utilized by, TLA 410. As shown in FIG. 4, topic engine 413 is in communication with TLA 410 for ease of illustration. TLA 410 generates non-binding suggestions 411 including candidate questions 462. Candidate questions 462 may be based at least in part upon topic engine 413 output and provided to UI controller 430 for consideration and possible processing.

As shown in FIG. 4, system 400 includes TLA 410 comprising or executing a declarative rule engine or processor 412 that is used to scan or analyze decision tables 460 using runtime or instance data 442 read by TLA 410 and stored to a fact cache 414. Rule engine 412 generates either non-binding suggestions 411 of additional topic(s) or question(s) 462 to present to a user, or "Done" instructions which indicate that completeness has occurred for a particular topic or for an electronic tax return as a whole such that no additional input for the topic or electronic tax return is not needed. Depending on system configurations, rule engine 412 may operate in the form a Drools expert engine. Other declarative rules engines 412 may be utilized and a Drools expert rule engine is provided as one example of how embodiments may be implemented. TLA 410 may be implemented as a dedicated module or engine that is executed by or as part of the tax return preparation application and may be embodied as a programmed subroutine that is executed by a processor or controller as described herein. Further, given the modular nature of system components, components may be incorporated into a tax return preparation application or be executed as a distributed system, e.g., on two or more different computing systems through respective networks. For example, TLA 410 determinations can be determined separately of UI controller 430 functions, which are performed separately of calculation engine 480 processing, one or more or all of which may be managed by respective independent computers through respective networks such that communications between components described herein may be performed through respective networks between respective computing devices. Thus, embodiments provide for a flexible and distributed tax return preparation system in which UI determinations and interview screen presentment are independent of tax logic and tax calculations.

In certain embodiments, and as illustrated in FIG. 4, TLA 410 reads runtime data 442 from shared data store 440, which his shared by UI controller 430 and tax calculation engine. TLA 410 can read runtime data 442 from shared data store 440, UI controller 430 can write data to shared data store 440, and calculation engine 480 can read data from shared data store 440, perform a calculation of calculation graph 482, and write a calculation result 442r ("r" indicating "result") to shared data store 440.

TLA 410 is operable to receive runtime or instance (I) data (generally, runtime tax return data 442) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc.

An instance 442 is instantiated or created for the collection of data received and for each term or topic of schema 446. Schema 446 may also specify data constraints such as a certain format of questions and answers (e.g., answer is binary (Y/N) or a number/value). It will be understood that schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

Instances can be identified and distinguished (e.g., for multiple instances of the same topic or tax form), and a generated identifier (ID) for an instance (I) based on schema 446 when writing data to shared data store 440. Thus, instances of runtime data 442 and non-binding suggestions 411 that may involve the same term or element of schema 446 are distinguished. For example, if a taxpayer has multiple Form W-2s for different jobs, or multiple 1099-INT forms for interest earnings from different financial institutions, embodiments are utilized to uniquely identify and distinguish these two different forms for the same topic by different instance identifiers. In this manner, calculation engine 480, TLA 410, and UI controller 430, initially and when processing non-binding suggestions 411, can uniquely identify the proper Form W-2 or Form 1099-INT that is the subject of a calculation result 442r or non-binding suggestion 411, for example, and which ones are not.

With continuing reference to FIG. 4, runtime electronic tax return data 442 stored in shared data store 440 is used to eventually populate corresponding fields of an electronic tax return or electronic tax forms or documents and may be received from or based on data from various data sources 450a-d (generally, source 450). Examples of sources 450 or type of source data include user input or manual entry 450a of data into an interview screen 432 generated by UI controller 430, data imported from one or more prior year electronic tax returns 450b, which may be received from a computer 451 of a tax authority 452 with which the prior year electronic tax return was filed, a prior year tax return file locally stored on a user's computing device 453, or a tax return file from another tax preparation application 454.

For example, a tax preparation application constructed according to embodiments may be provided by Intuit Inc., and retrieves an electronic file that was prepared using a different tax preparation application available from H&R Block. Other examples of sources 450 or source data include data from online resources 450c (such as online social networks such as facebook.com, linkedin.com or other online resources) and third party databases 450d or resources (such as government databases or documents, such as property tax records, Department of Motor Vehicle (DMV) records, etc. Further examples of sources 450 or source data, which are also shown in FIG. 4 as being inputs to topic engine 413 for ease of illustration, include data of an account the user has with a financial management system 450e such as Mint™, FINANCEWORKS, QUICKEN, and QUICKBOOKS financial management systems available from Intuit Inc., Mountain View, Calif.

A FMS 450e account may include transaction data indicating categories or types of items or services purchased by a taxpayer and in some cases, item-level data, such as Level III data, identifying specific items or services that were purchased. A FMS 450E is defined to include, any computing system implemented, on-line or web-based, system, package, program, module, or application that gathers financial data, has the capability to receive or retrieve financial data including item-level electronic transaction data, analyze and categorize at least part of the financial data into various reports or displays that are provided to a consumer, and provides consumer with the capability to conduct, and/or monitor, financial transactions. Types of financial management systems 450e include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

A source 450 may also be an account the user has with a financial institution (FI) 450f, such as a checking account or credit card account. Such FI 450f accounts may also include transaction data for purchases made by taxpayer and may indicate a category of purchase or specific items that were purchased. While FIG. 4 illustrates topic engine 413 receiving inputs from sources including a source of a prior year tax return 450b, a FMS 450e and a FI 450f, it will be understood that topic engine 413 may receive data from one or more or all of the above-mentioned sources and other sources of prior year tax return data. For example, data of statistics 490 or a life knowledge module that may involve other taxpayers or taxpayers that have similar tax situations as the taxpayer and a library 495 of predictive models 492, as discussed in further detail below.

With continuing reference to FIG. 4, TLA 410 reads runtime electronic tax return data 442 from shared data store 440 and utilizes or executes rules 461 expressed in a data structure such as decision table 460 based on graphical structure or completeness graph 465 to determine, based on currently available runtime electronic tax return data 442, what other data or answers are still needed in view of unanswered questions 462. In other words, TLA 410 determines what conditions of a rule 461 still need to be satisfied in order to reach a conclusion or completeness status for subject matter or topic of decision table 460, and in turn, which questions 462 of decision table 460 or other data structure should be presented to user in order to obtain that other needed data to reach a conclusion or state of completeness for that topic. For example, a rule 461 specified by decision table 460 may be based on a tax authority requirement or law, and may generally specify that If X, and Y, and Z, then Conclusion.

Rules 461 may involve various topics. "Tax" rules 461 that are utilized by rule engine 412 may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by TLA 410 to identify or narrow which questions 462, as provided in decision table 460, are identified as potential or candidate questions 462 to be presented to user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
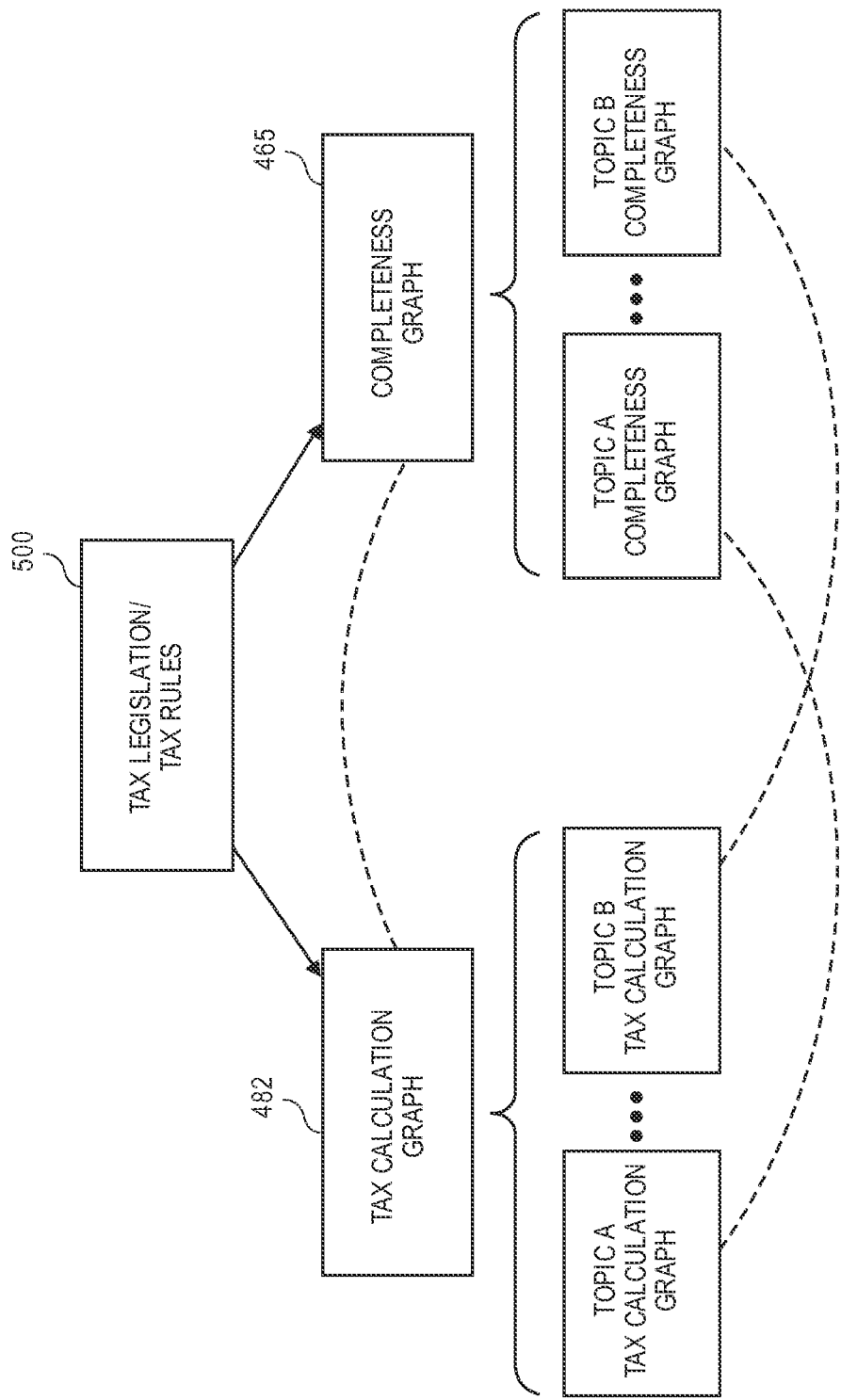
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed for a particular topic or for a tax return as a whole such that the electronic tax return can be prepared and ultimately filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
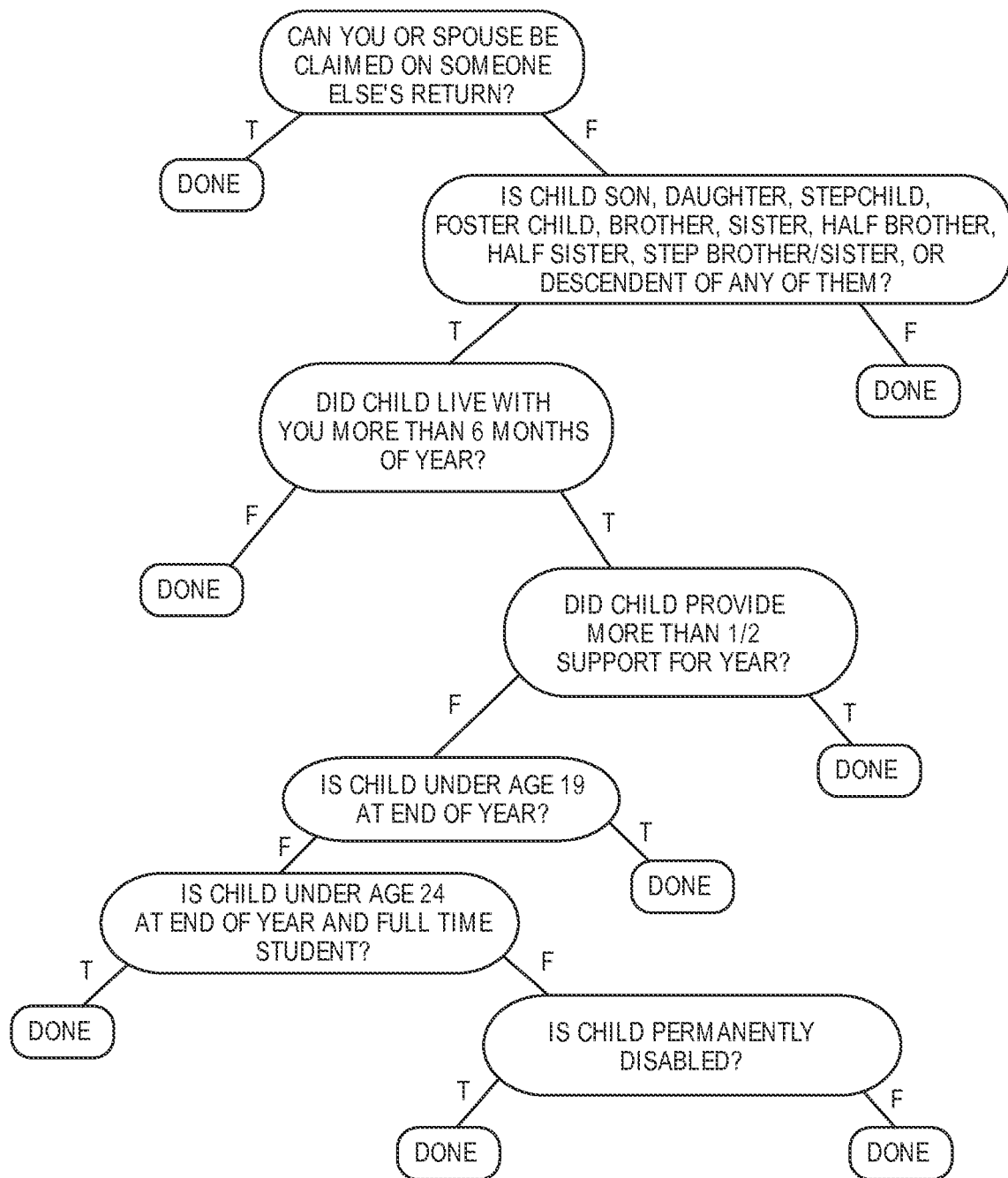
FIG. 5B illustrates an example of a simplified version of a completeness graph related to a qualifying child for purposes of determining deductions for federal income tax purposes.
Figure 5C:
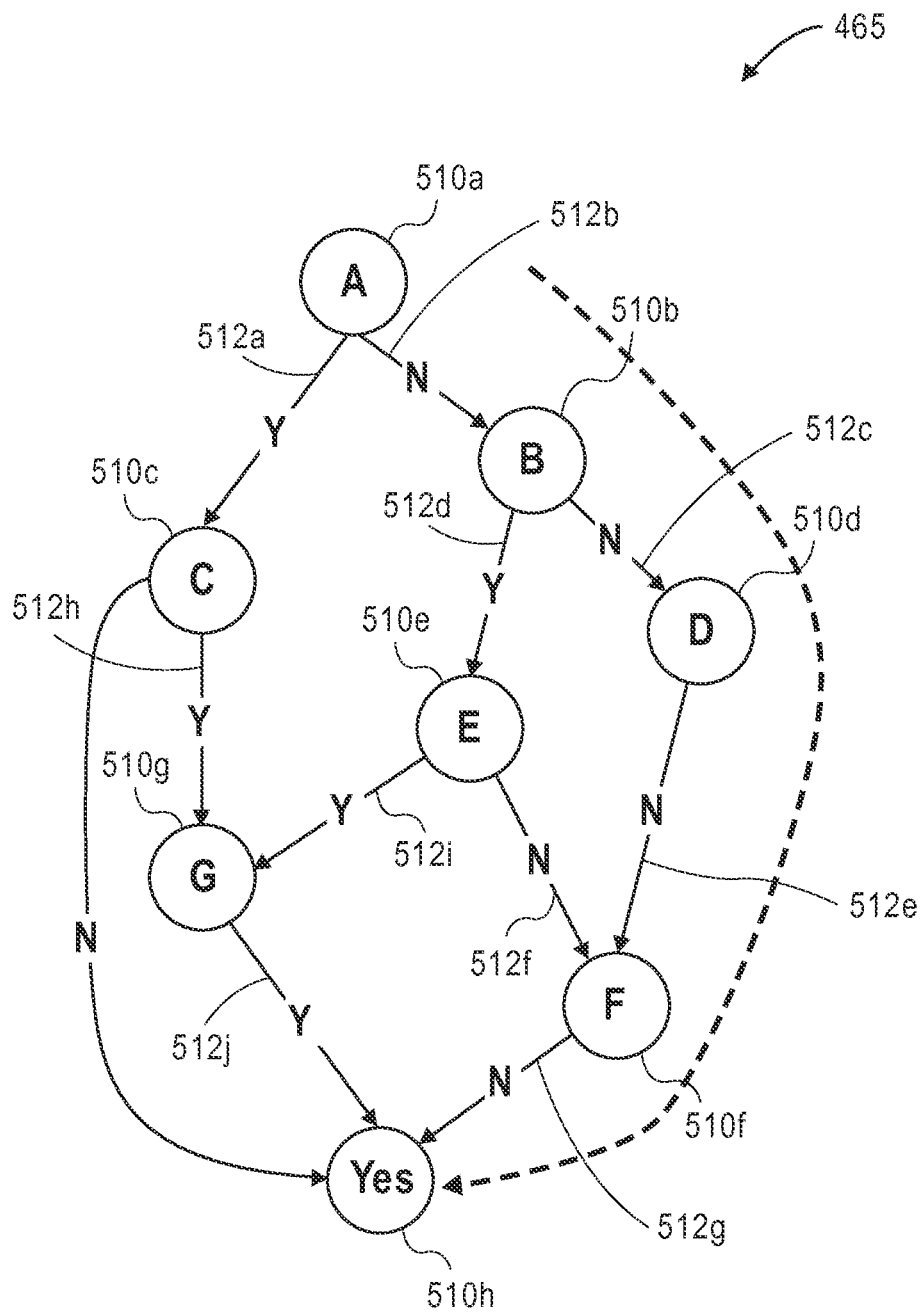
FIG. 5C illustrates an example of a directed graph or completeness graph.

Completeness graph 465 and tax calculation graph 482 represent graphical data structures that can be constructed in the form of tree, and decision table 460 reflects the structure and relationships expressed in completeness graph 465. FIG. 5C generally illustrates completeness graph 465 in the form of a tree structure including nodes 510a-g, in which node 510a is a beginning or start node, a "Yes" or termination node 510h indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097,057, entitled "Methods Systems and Computer Program Products for Applying Generates Rules for Personalized Interview Experience," the contents of which are incorporated herein by reference as though set forth in full.

Each node 510 in the completion graph 465 of FIG. 5C contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510a, intermediate nodes (Nodes B-G) 510b-g and a termination node (Node "Yes" or "Done") 510h. Each of the beginning node 510a, and intermediate nodes 510b-g represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Referring to FIG. 6A, decision table 460 generated by transformation of completeness graph 465 illustrated in FIG. 5C reflects the question-and-answer flow of completeness or directed graph 465. In the illustrated example, rows of decision table 460 define rules 461a-e (e.g., Rules R1-R5 as shown in FIG. 6A), and columns of the decision table 460 indicate questions 462a-g (generally, questions) (Q1-Q5 shown in FIG. 4 OR Qa-Qg as shown in FIG. 6A). During processing, decision table 460 is scanned by TLA 410 to determine which answers 464 or which aspects of a rule 461 or condition elements are included in received runtime data 442 stored in TLA cache 414 and read from shared data store 440. TLA 410 determines how much the runtime data 442 completes decision table 460 and determines or selects candidate questions 462 to be presented to user, answers to which would complete respective rule 461 conditions reflected in decision table 460.

Thus, TLA 410 uses decision tables 460 to analyze the runtime data 442 and determine whether a tax return is complete, and each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below presents interview questions to a user for answer. TLA 410 identifies decision table 460 corresponding to one of the non-complete topics or sub-topics and, using the rule engine 412, identifies one or more non-binding suggestions 411 to present to UI controller 430.

Non-binding suggestions 411 may include a listing of compilation of one or more questions from one or more decision tables 460.

Figure 6B:
FIG. 6B illustrates another embodiment of a decision table that incorporates statistical data that may be used for determining a likelihood or probability of an answer to a question of the decision table according to embodiments.

The following pseudo code generally expresses how a rule engine 412 functions utilizing TLA fact cache 414 based on the runtime canonical data 442 or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to fact cache 414 so that the needed inputs can be recalled at a later time, and to determine what is already known about variables, factors or requirements of various rules:

Rule engine (412)/Tax Logic Agent (TLA) (410)
    // initialization process
    Load_Tax_Knowledge_Base;
    Create_Fact_Cache; While (new_data_from_application)
      Insert_data_into_fact_cache;
        collection=Execute_Tax_Rules; //collection is all the fired rules and
    corresponding conditions
    suggestions=Generate suggestions (collection);
    send_to_application(suggestions);

In one embodiment, as shown in FIG. 6B, statistical data 463 (which may be appended as columns to rule-question decision table 460 shown in FIG. 6A, may be received from or based on data collected by life knowledge module 490 described in further detail below) indicates how likely a question or topic 462 is to be relevant to a user given a set of runtime data 442 and may be utilized by rule engine 412 when determining which candidate question or topic 462 to select. Instead of, or in addition to, statistical data, embodiments may also involve TLA 410 executing one or more predictive models 492, which may be part of a predictive model library 495, for purposes of determining how likely a question or topic 462 is to be relative to a given user based on input runtime data 442. Examples of predictive models 492 that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data 463 in the form of percentages. Column (STAT1 shown in FIG. 6B) may contain a percentage value that indicates taxpayers under the age of thirty-five where $Rule_1$ is satisfied. Another column (STAT2 shown in FIG. 6B) may contain a percentage value that indicates taxpayers over the age of thirty-five where $Rule_1$ is satisfied. Any number of additional columns could be added to the decision table 460 and statistics do not have to relate to an age threshold or grouping. Statistical data 463 may be used by the tax return preparation application to determine which of the candidate questions (QA-QG) 462 should be selected by TLA 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

For example, life knowledge module 490 may indicate that taxpayers residing within a particular zip code are more likely to be homeowners than renters. TLA 410 may use this knowledge to weight particular questions related to these topics when processing rules 461 and questions 462 and generating non-binding suggestions 411. TLA 410 may also receive or otherwise incorporate information from life knowledge module 490 for these purposes. Life knowledge module 490 contains statistical or probabilistic data and/or results generated by predictive models related to the current or other users of the tax return preparation application and/or other taxpayers.

Non-binding suggestions 411 generated by TLA 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by TLA 410 to be used as part of the candidate question ranking which, in turn, may be used by TLA 410 to assign a ranking to the non-binding suggestions 411 generated by TLA 410.

For example, questions 462 about home mortgage interest may be promoted or otherwise given a higher weight for users in particular zip codes or income levels. Statistical knowledge 490 or results generated by execution of predictive models may apply in other ways as well. For example, tax forms often require a user to list his or her profession. These professions may be associated with transactions that may affect tax liability. For instance, a taxpayer may list his or her occupation as "teacher." Life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430.

For example, candidate questions 462 of a non-binding suggestion 411, and non-binding suggestions 411 themselves, may be ranked as described in U.S. application Ser. No. 14/462,058, filed Aug. 18, 2014, entitled "Computer Implemented Methods Systems and Computer Program Products for Ranking Non-Binding Suggestions During Preparation of Electronic Tax Return and U.S. application Ser. No. 14/461,982, filed Aug. 18, 2014, entitled "Computer Implemented Methods Systems and Computer Products for Candidate Question Scoring and Ranking During Preparation of Electronic Tax Return, the contents of all of which are incorporated herein by reference as though set forth herein in full. Such ranking may be based on, for example, a type of probability, estimate, assumption or inference determination, which may involve statistical analysis or execution of a predictive model using electronic tax return data as inputs.

Data that is contained within life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by life knowledge module 490. This information may be periodically refreshed or updated to reflect the most up-to-date relationships. Generally, the data contained in the life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses that data 442 as answers or inputs to tax logic I the form of decision table 460 derived from or based on completion graph 465 to eliminate rules 461 that may apply which, is used to eliminate questions 462 from consideration rather than requiring the user to step through each question of a pre-determined sequence of questions in order to conclude that a particular tax situation or topic applies to the user.

Referring to FIG. 6C, and continuing with the example of decision table 465 shown in FIG. 6A, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

TLA 410 provides to UI controller 430 a non-binding suggestion 411 comprising a selected question or topic 461 to be addressed. In the illustrated embodiment, UI controller 430 includes a UI or user experience manager 430 that determines how to process the non-binding suggestions 411 with selected questions 461 and generates an interface or interview screen 432 for the UI or selects an interview screen of the UI based on the question or topic 461 of the non-binding suggestion 411. For ease of explanation, reference is made to interview screen generator 432 or resulting interview screen 432. UI controller 430 may include suggestion resolution element, a generator element, and an interview screen management element or flow/view management" module, as described in U.S. application Ser. No. 14/097,057, filed Dec. 4, 2013, entitled Methods Systems and Computer Program Products for Applying Generated Rules for Personalized Interview Experience", the contents of which are incorporated herein by reference as though set forth in full.

For example, as described in the above-identified incorporated application, a configuration file 433 of UI controller 430 may specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that UI controller 430 should wait for additional data and/or until a final review stage initiated by the user. As another example, this may involve classifying non-binding suggestions 411 as being ignored. A configuration file 433 may also specify content (e.g., text) of the interview screen that is to be generated based at least in part upon a non-binding suggestion 411.

UI manager 431 of UI controller 430 may include a generator element that is in communication with a suggestion element and that generates the resulting user interaction or experience or creates or prepares an interview screen 432 or content thereof based on the output of the suggestion element and input received from the interview screen management element. For this purpose, generator element may communicate with the interview screen management element, which manages a library of visual assets. Visual assets may be pre-programmed interview screens that can be selected by the interview screen management element and provided to the generator element for providing resulting interview screen 432 or content or sequence of interview screens 432 for presentation to the user. Visual assets may also include interview screen 432 templates, which are blank or partially completed interview screens 432 that can be utilized by the generation element to construct an interview screen on the fly during runtime in the event that an appropriate pre-programmed or pre-determined interview screen or other visual asset is not available or cannot be identified by the interview screen management element.

More specifically, in one embodiment, as described in the incorporated application, UI manager 431 of the UI controller 430 includes a suggestion resolution element or "Suggestion Resolver," a generator element or "Generator," and an interview screen management element or "Flow/View Management." The suggestion resolution element is responsible for resolving the strategy of how to respond to incoming non-binding suggestions 411. For this purpose, the suggestion resolution element may be programmed or configured internally, or based on interaction configuration files 433, which specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that the UI manager 430 should wait for additional data and/or until a final review stage initiated by the user. As another example, this may involve classifying non-binding suggestions as being ignored. A configuration file 433 may also specify content (e.g., text) of the interview screen 423 that is to be generated based at least in part upon a non-binding suggestion 411.

The generator element is in communication the suggestion element and generates the resulting user interaction or experience or creates or prepares an interview screen 432 or user interface or content thereof based on the output of the suggestion element and input received from the interview screen management element. For this purpose, the generator element may communicate with the interview screen management element, which manages a library of visual assets. Visual assets may be pre-programmed interview screens that can be selected by the interview screen management element and provided to the generator element for providing the resulting interview screen or content or sequence of interview screens 432 to the UI for presentation to the user. Visual assets may also include interview screen templates, which are blank or partially completed interview screens that can be utilized by the generation element to construct an interview screen 432 on the fly during runtime in the event that an appropriate pre-programmed or pre-determined interview screen or other visual asset is not available or cannot be identified by the interview screen management element. The following exemplary pseudocode describes system components and data described above:

Suggestion Resolution Element
// Take a suggestion and consult the behavior configuration to
// decide which ones the UI will handle
Suggestions=Get suggestions_from_TLA;
New_list=Rank_and _Filter(Suggestions, Configuration_File);
Generation Element
For each item in New_list
UI_asset=Flow_View_Manager(item);
If UI_asset==NULL // if Flow_View_Manager does not have any ready
to go asset for the item
Template=Get_Template(item) // identify a template based on the item e.g. its type
UI_asset=Construct_UI _Asset(Template, item)
End
End
Interview Screen Management Element
Provide look-up capability to return UI asset (flow/view) if there is any, for given model field For ease of explanation and illustration, reference is made to UI controller 430, which, given the use of data structures described herein, permits UI controller 430 to be loosely connected or even divorced from the TLA 410 and tax calculation engine 480 and the data used in the tax calculations that is stored in shared data store 440.

Figure 7:
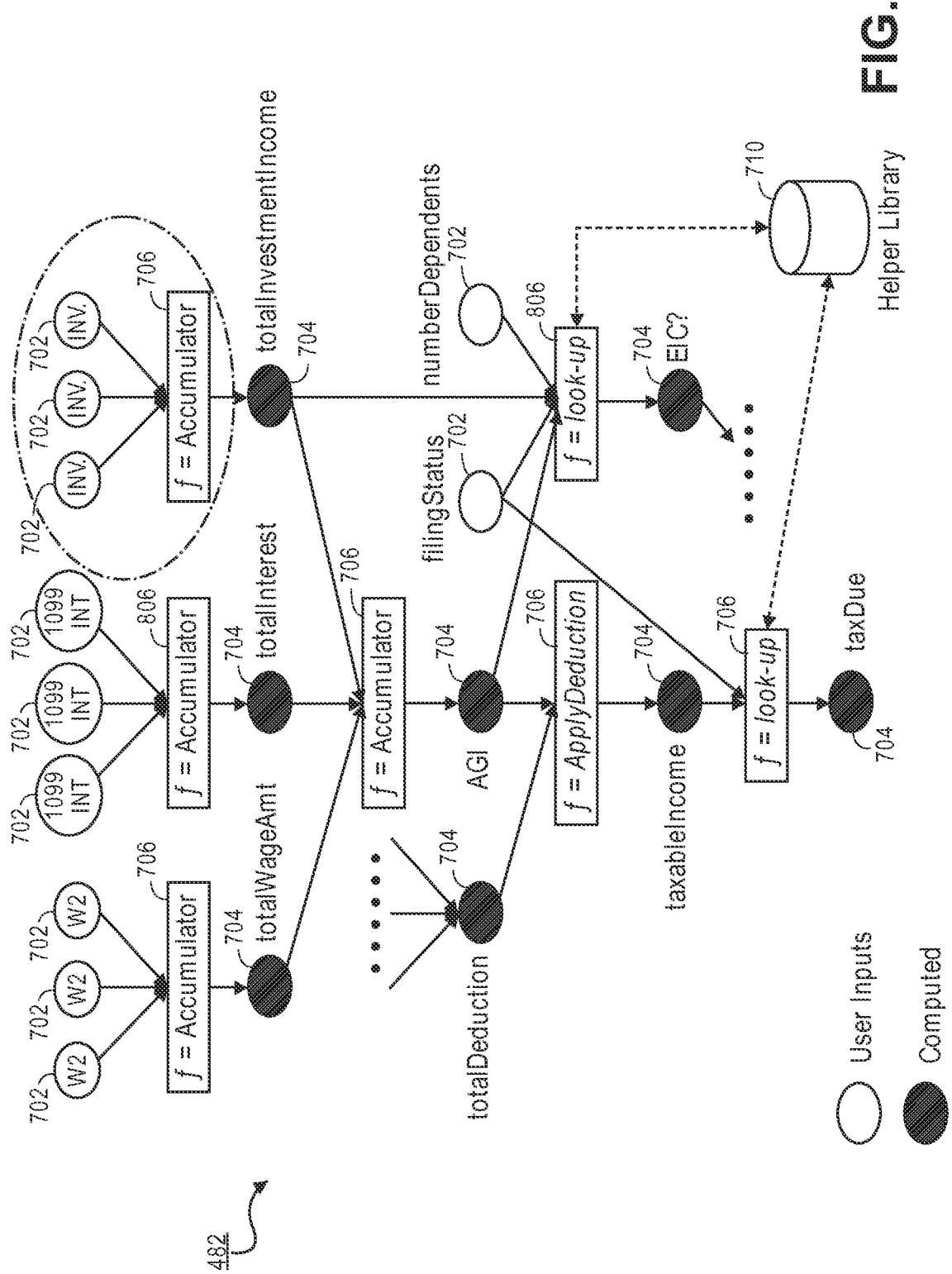
FIG. 7 illustrates an example of a calculation graph that is populated with runtime data and that includes input nodes, function nodes and result nodes.

With continuing reference to FIGS. 4 and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by TLA 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes are input nodes 702. Examples of input nodes 702 in this particular example include data obtained from W-2 forms, data obtained from 1099-INT forms, data obtained from other investment income (INV), filing status, and number of dependents. Typically, though not exclusively, input nodes 702 are populated with user inputs. That is to say the user taxpayer will enter this information from a user interface as described herein. In other embodiments, however, nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate nodes 702. Online resources such as financial services websites or other user-specific websites can be crawled and scanned to scrape or otherwise download tax related information that can be automatically populated into nodes 702. Additional third party information sources such as credit bureaus, government databases, and the like can also be used by the tax preparation software to obtain information that can then be populated in to respective nodes 702.

In still other embodiments, values for nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for nodes 702 may be estimated.

Still other internal nodes referred to as functional nodes 704 semantically represent a tax concept and may be calculated or otherwise determined using a calculation function 706, which generates a calculation result that is to be utilized in the electronic tax return (as opposed to other intermediate "functions" described below such as a hash function). Functional node 704 and the associated function 706 define a particular tax operation. For example, as seen in FIG. 7, operation refers to total wage income and is the result of the accumulator function 706 summing all W-2 income from input nodes 702. Functional node 704 may include a number in some instances. In other instances, the functional node 704 may include a response to a Boolean expression such as "true" or "false." Functional nodes 704 may also be constant values in some instances. Some or all of these functional nodes 704 may be labeled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 706 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior hard-wired approaches.

Tax calculation graph 482 and the associated function nodes 704 and functions 706 can be tagged and later be used or called upon to intelligently explain to the user the reasoning behind why a particular result was calculated or determined by the tax preparation software program. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that function nodes 704 in tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. Smart tax logic agent 410 running on set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

In the embodiment illustrated in FIG. 4, UI controller 430 also includes or utilizes an identity generator module that generates an identifier (ID) for an instance (I) to be generated based on schema 446 of shared data store 440. Thus, embodiments involve an ID generator that generates identifier (I) for instance (I) so that instances can be uniquely identified and non-binding suggestions 411 the same term or element of schema 446 can be distinguished.

For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not.

Figure 8:
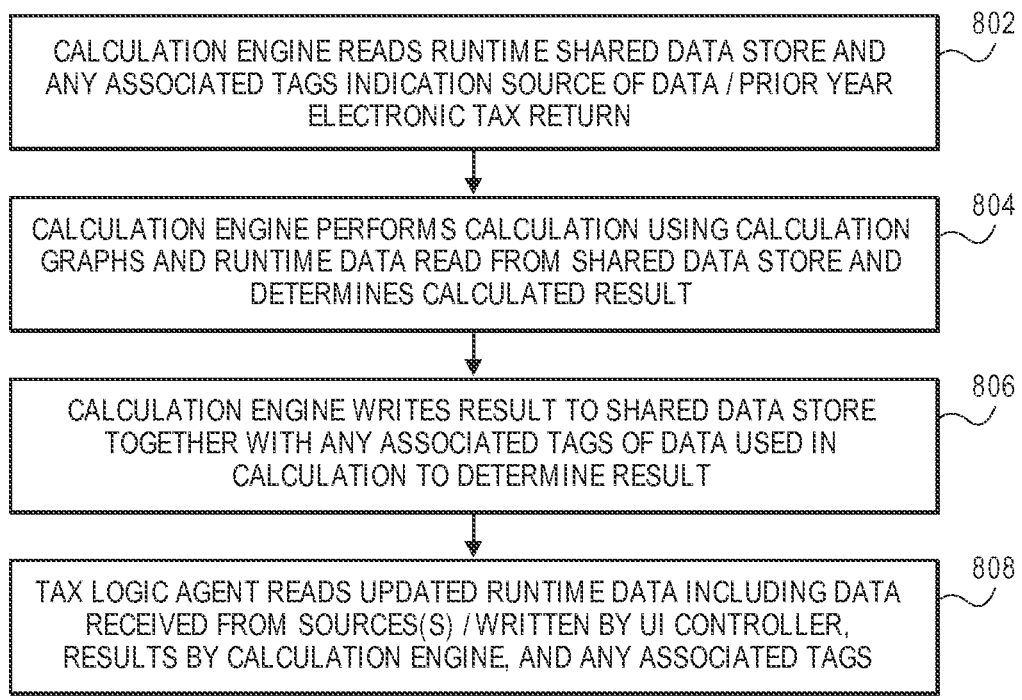
FIG. 8 is a flow diagram illustrating processing by a calculation engine of a computerized modular tax preparation application including processing of runtime data read from a shared data store and generating results that are written back to the data store.

With continuing reference to FIG. 4, and with further reference to FIG. 8, at 802, calculation engine 480 reads runtime data 442 from shared data store 440 (including any runtime data tags 442t such as tags identifying data as "sensitive" data such as personal identification data (e.g., name, social security number of taxpayer, spouse or dependent) or other private data (such as address, account number or demographic data) and whether runtime data 442 in shared data store 440 is original/unconfirmed runtime data, confirmed runtime data, corrected runtime data. At 804, calculation engine 480 uses calculation graphs 482 and runtime data 442 read from shared data store 440 and determines a calculation result 442r ("r" referring to result). At 808, calculation engine 480 writes result 442r to shared data 440 store together with associated tags 442t of electronic tax return data used in the calculation.

Figure 9:
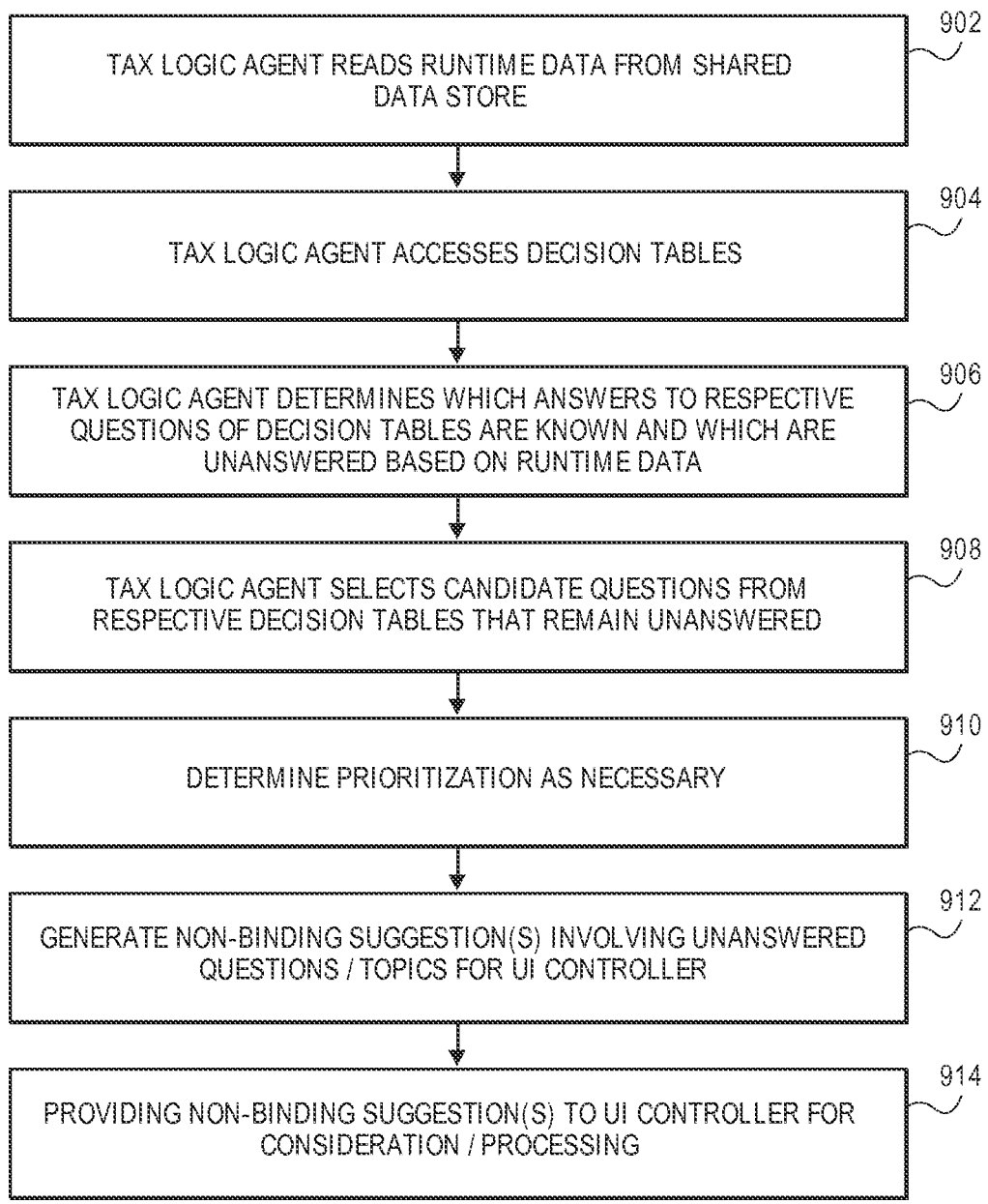
FIG. 9 is a flow diagram illustrating processing by a tax logic agent of a computerized modular tax preparation application that involves reading runtime data including results generated by calculation engine from a shared data store and analyzing a decision table to identify subject matter for non-binding suggestions.

At 808, and with further reference to FIG. 9, TLA 410 reads updated runtime data 442 (including electronic tax return data 442 received from source(s) 450, result(s) 442r, and any associated tag(s) 442t from shared data store 440 from shared data store 440, and at 904, TLA 410 accesses decision tables 460, determines which answers to respective questions 462 of decision table(s) 460 are known based on runtime data 442 at 906, and determines which selected unanswered questions 462/topics are based at least in part upon runtime data 442 including any tags 442t. At 908, TLA 410 selects candidate question from decision table(s) 460 that remain unanswered given the runtime data 442, determines prioritization as necessary at 910 (e.g., prioritize unanswered questions 462 associated with suspect data so that user can confirm or correct suspect data), and at 912, generates non-binding suggestions 411 involving unanswered questions topics and/or for UI controller 430. At 914, non-binding suggestions 411 are provided to UI controller 430 for processing.

Figure 10:
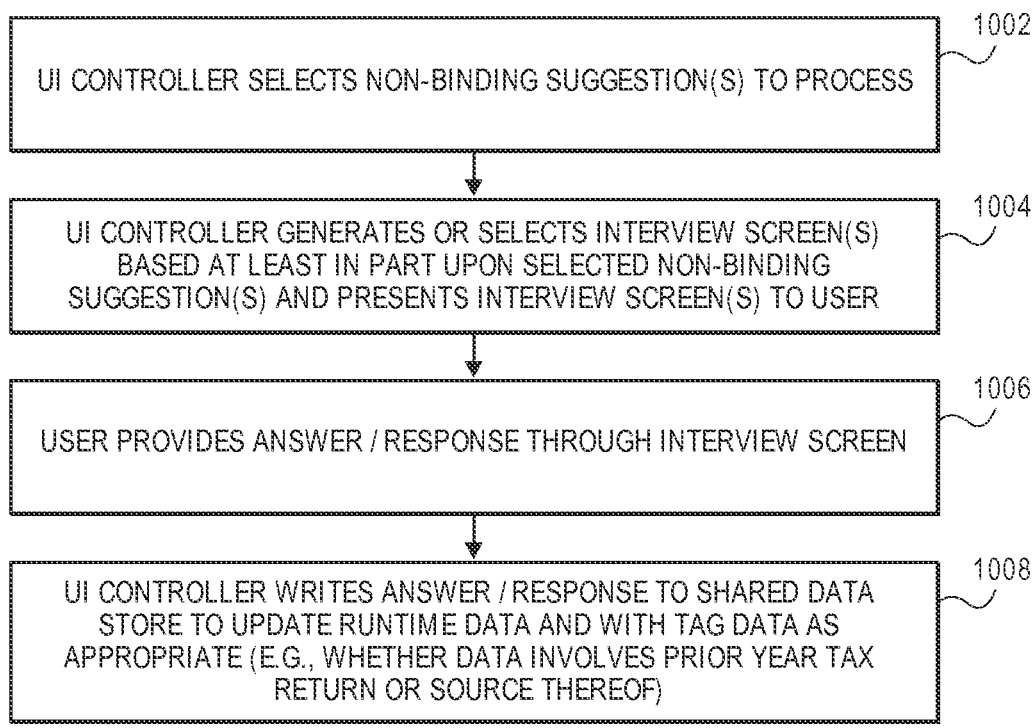
FIG. 10 is a flow diagram illustrating processing by a user interface controller of a computerized modular tax preparation application that involves processing non-binding suggestions generated by the tax logic agent and writing data received from the user and electronic sources and writing received data to a shared data store.

Referring to FIG. 10, at 1002, UI controller 430 selects non-binding suggestion(s) 411, e.g., according to a configuration file 433, and at 1004, generates or selects interview screen(s) 432 based at least in part upon selected non-binding suggestion(s) 411 and presents interview screen to user. At 1006, the user provides answer/response 436 through interview screen 432, and at 1008, UI controller 430 updates active runtime data 442 maintained by shared data store 440. UI controller 430 updates runtime data 441 maintained by shared data store 440 and updates electronic tax return data tags 441*t* as necessary. UI controller 430— calculation engine 480—TLA 410 processing is repeated until a state of completion with UI controller 430 writing data to shared data store 440, calculation engine 480 reading data from shared data store 440, TLA 410 reading data from shared data store 440 and generating non-binding suggestions 411 for consideration by UI controller 430. Having described embodiments of a modular tax preparation system that may be utilized in embodiments, the following descriptions provide further details regarding how components of such a modular tax preparation system may be utilized for embodiments involving selection of computing resources for performing logic and/or calculation computations, accounting for data tagged as sensitive data, determining calculation results during preparation of an electronic tax return without performing calculations during preparation of that electronic tax return or as part of preparation of that electronic tax return, and determining electronic tax return data of other users and proceeding to prepare an electronic tax return.

Logic computations, as described above with reference to FIGS. 5A-C and 6A-C involving a completeness graph 465, decision table 460 and tax logic agent 410. Tax logic agent 410 executes computations by utilizing or scanning a decision table 460 to identify or narrow which questions 462, as provided in decision table 460, are identified as potential or candidate questions 462 to be presented to the user. This may involve utilizing rules 461 based on one or more associated data structures such as decision table 460, which is based on a completion graph 465, which recites, for example, requirements of tax authority or tax authority rules or laws.

In contrast to logic computations, and as described above with reference to FIG. 7, calculation computations involve tax calculation graph 482. In the illustrated embodiment, tax calculation graph 482 includes input nodes 702, function nodes 704 and result nodes 706 that are populated (vs. cache 414 that stores data for tax logic agent 410 and analyzes decision table 460. Input nodes 702 are populated with user inputs and/or information that is automatically obtained by the tax preparation software or based on a calculation, functional nodes 704 that semantically represent a tax concept and may be calculated or otherwise determined using a function 706, and result nodes. Interconnected function nodes 704 may contain data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability.

In the illustrated embodiment, topic engine 413 serves to identify questions for tax logic agent, which then generates a non-binding suggestion based thereon, or to supplement questions identified by tax logic agent's analysis of runtime data stored in cache and tax logic of decision table and associated rule. While topic engine 413 may utilize various sources of data for these purposes, embodiments are described with reference to topic engine utilizing a source of a prior year tax return and, in certain embodiments, at least one other source of data that is utilized to identify potential questions applicable to the current electronic tax return being prepared.

While FIG. 4 illustrates one example of how embodiments may be implemented in which a tax preparation system includes TLA 410 including topic engine 413, UI controller 430, calculation engine 480 and shared data store 440, other system configurations may also be utilized give the modular nature of components. For example, other embodiments involve a distributed/networked configuration in which different modular components are hosted by respective computing devices and communicate through respective networks. As another example, in another system configuration, TLA 410 including topic engine 413, calculation engine 480, and UI controller 430 components are hosted by a computing device, and shared data store 440 is hosted by another computing device and accessible by a network, and computing resources 486 are accessible through respective networks 487. For ease of explanation, reference is made generally to UI controller 430, TLA 410 including topic engine 413, calculation engine 480 and shared data store 440, and topic engine 413 being in communication with various sources of data utilized for topic prediction, and such sources being local or remote and accessible via respective networks.

Figure 11:
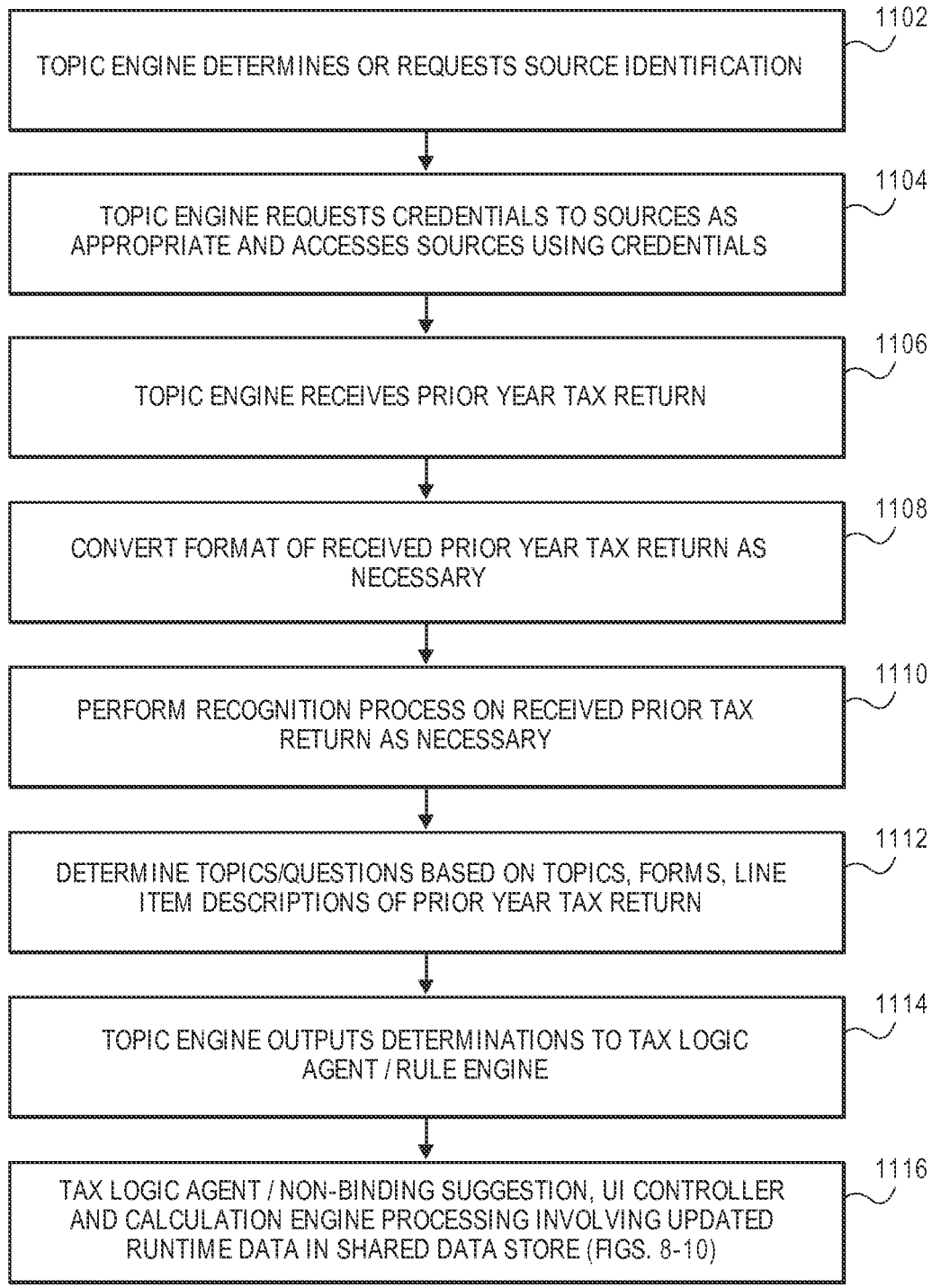
FIG. 11 is flow diagram of a computer-implemented method for accessing a source of prior year tax returns and processing prior year tax returns to identify potential tax topics or questions for a current electronic tax return being prepared.

With continuing reference to FIG. 4 and with further reference to FIG. 11, in a computer-implemented method executed according to one embodiment using components of a modular tax preparation system 400 described above, at 1102 topic engine 413 determines or requests identification of sources 450 or source data such as a prior year tax return 450*b* (generally, 450) to be utilized for prediction of a topic or question. The topic or question format or terms may be based on terms of schema 446 and questions 462 of decision table 460, which is based on completeness graph 465. For ease of explanation reference is made to questions 462 of decision table and questions 413*q* identified by topic engine 413. At 1104, if necessary, topic engine 413 requests credentials from a user and utilizes credentials to access source 450, e.g., via a network and utilizing a username and password provided by taxpayer, to access a prior year tax return 450*b* at 1106.

For example, when embodiments are employed in a tax preparation system such as TURBOTAX tax preparation system provided by Intuit Inc., and a user or taxpayer identifies that a prior year electronic tax return 450*b* was generated by a tax preparation system available from H&R Block, user or taxpayer may provide TURBOTAX tax preparation application with credentials to access a server of H&R Block to retrieve prior year tax return. As another example, user credentials may be required to access a prior filed tax return 450*b* from a computer 452 of a tax authority 451 such as the Internal Revenue Service.

While reference is made to topic engine 413 communicating with source 450 in order to receive prior year tax return 450*b*, it will be understood that prior year tax return 450*b* data may be received by UI controller 430, written to shared data store 440 by UI controller 430 and tagged 442*t* to indicate that the data is form prior year tax return 450*b* such that TLA 410/topic engine 413 reads tags 442*t* applied by UI controller 430 when reading runtime data 442 from shared data store 440 for processing by topic engine 413. More specifically, UI controller 430 may communicate with computer 451 of tax authority 452 as shown in FIG. 4 to request and receive, or read, an electronic copy of prior year tax return 450*b*, perform a recognition or conversion process as needed, and write the prior year tax return 450*b* data with a tag 442*t* to shared data store 440. Thus, in embodiments in which topic engine 413 is a component of or utilized by TLA 440, UI controller 430 can serve to retrieve prior year tax returns 450*b* and read or determine data thereof, which is then subsequently analyzed by TLA 410 and topic engine 413. TLA 410 then generates a non-binding suggestion 411 involving that data, and the generated non-binding suggestion 411 is provided to UI controller 430.

Continuing with reference to FIG. 11, at 1108, prior year tax return 450*b* received from source 450 is converted if needed into a format that can be read by topic engine 413. For example, this may involve converting a format utilized by H&R Block into a format utilized by Intuit, Inc., or converting a format of the prior year tax return as stored by a tax authority computer 451 into a different format. It will be understood that tax preparation applications can read tax return files of various formats.

At 1110, in cases in which the prior year tax return 450*b* is in the form of a printed copy read only .pdf file, for example, topic engine 413 may employ a recognition process, such as Optical Character Recognition (OCR), to determine various alpha-numeric data and identify forms, worksheets and various aspects of the prior year tax return 450*b*. At 1112, utilizing an electronic format recognized by tax preparation system, or based on results of OCR, topic engine 413 reads data of the prior year return 450*b* and determines identifies topics/questions 413*q* expressed in a form based on terms of schema 446 and decision table 460/completion graph 465 that are potentially pertinent to the current electronic tax return being prepared. This determination may be based at least in part upon labels, line item descriptions, titles other identifying data of documents of the prior year tax return 450*b*, which can be mapped to schema 446 terms as needed so that the output of questions 413*q* generated by topic engine 413 is consistent with terms of schema 446, decision table 460 and completeness graph 465 for seamless processing by TLA 410. At 1114, topic engine 413 provides an output to TLA 410 with identified topics/questions 413*q*. At 1116, TLA 410 generates a non-binding suggestion 411 based at least in part upon topic engine 413 output of questions/topics 413*q*, and processing involving TLA 410 and topic engine 413, UI controller 430, calculation engine 480 and shared data store 440 as described above with reference to FIGS. 4-10 is iteratively repeated as runtime data 442 is updated with calculation results or additional data received from user or imported from a source 450.

Figure 12:
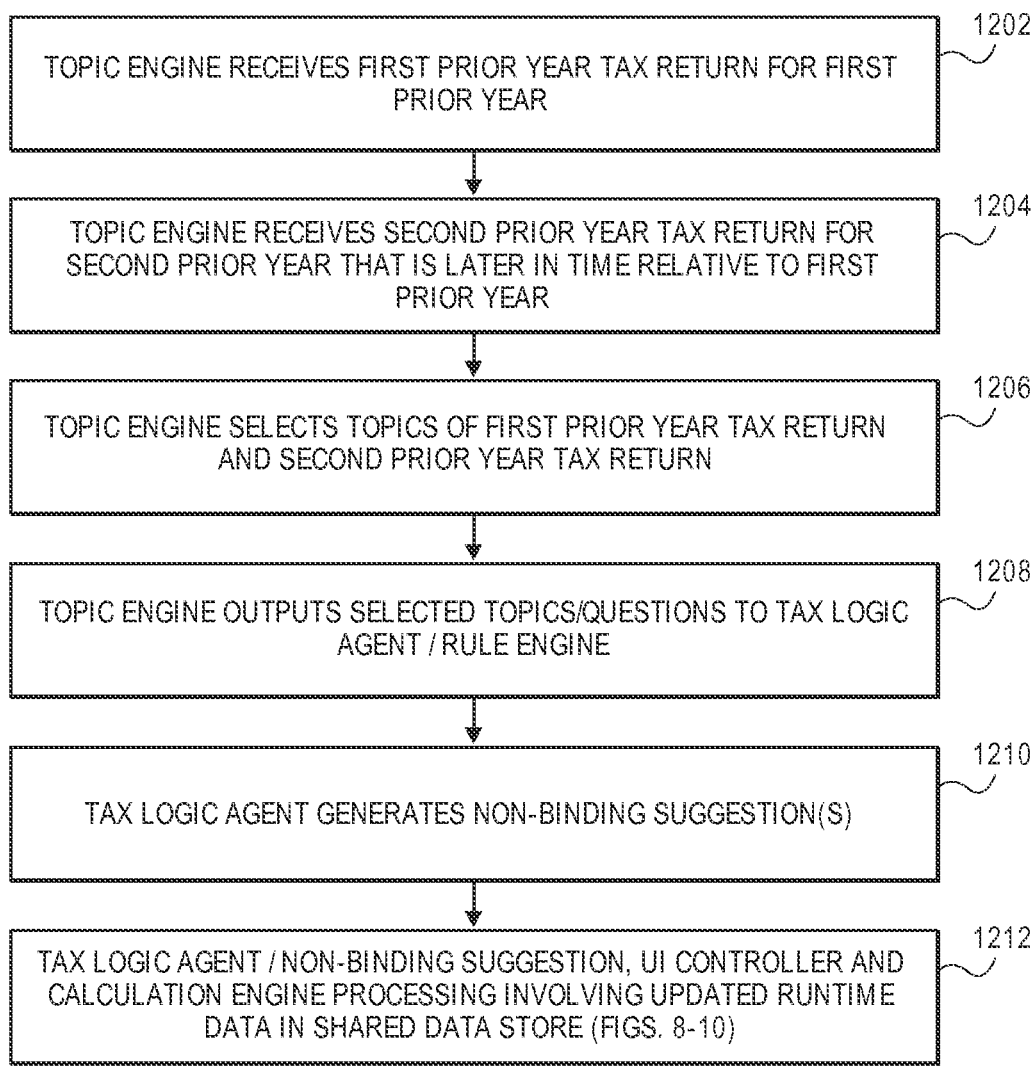
FIG. 12 is flow diagram of a computer-implemented method for identifying potential tax topics or questions for a current electronic tax return being prepared based on multiple prior tax returns.

Referring to FIG. 12, another embodiment involves topic engine 413 receiving prior year tax returns 450*b* for multiple years rather than for a single prior year. In the embodiment of FIG. 12, topic engine 413 may utilize a combination of topics of a first prior year return 450*b*-1 for a first prior year and a second prior year return 450*b*-2 for a second prior year that is later in time compared to the first prior year. Tax engine 413 may also identify questions that were addressed in both prior year returns 450*b*-1, 450*b*-2. Question identification may also be based at least in part upon a condition that topics were addressed in consecutive prior year returns 450*b*, which may involve a further condition that at least one of the prior year returns 450*b* of the consecutive prior year returns is the most recent prior year return 450*b*.

Referring to FIG. 12, at 1202, topic engine 413 receives first prior year tax return 450*b*-1 for first prior year, and at 1204, topic engine 413 receives second prior year tax return 450*b*-2 for second prior year before first prior year. Different prior year tax returns 450*b*-1, 450*b*-2 may be received from the same source 450 or from different sources 450. For example, both prior year returns 450*b*-1, 450*b*-2 may be received from a computer 451 of a tax authority 452, from a computing device 453 of a taxpayer, or from another tax preparation system 454 utilized by the taxpayer for those prior years. As another example, one prior year tax return 450*b* may be received from one source 450, whereas the other is received form a different source 450. For example, one prior year return 450*b* may be received from a computer 452 of a tax authority 451, whereas the other is retrieved from a computing device 453 of the taxpayer. As another example, one prior year tax return 450*b* may be received from a computer 451 of a tax authority 451, and the other is received from a remote server of another tax preparation application 453 accessed by taxpayer provided credentials.

At 1206, topic engine 413 selects topics of one or both of the first prior year tax return 450*b*-1 and second prior year tax return 450*b*-2 based on pre-determined selection criteria. In one embodiment, pre-determined selection criteria involves the most recent prior year return, or 450*b*-1 in the above example. Topic engine 413 may utilize the most recent prior year tax return 450*b*-1 and ignore earlier or older prior year tax returns 450*b*. In another embodiment, pre-determined selection criteria involves the most recent prior year tax return 450*b*-1, but instead of ignoring other topics of an earlier return 450*b*-2, topic engine 413 indicates that these other topics are lower priority due to being less recent returns, which may be reflected in non-binding suggestions 111 generated by TLA 110. In a further embodiment, pre-determined section criteria involves topics of both the first and second prior year tax returns 450*b*-1, 450*b*-2. In another embodiment, pre-determined section criteria involves selection of topics of both first and second prior returns 450*b*-1, 450*b*-2 upon the condition that they are prior year returns for consecutive prior years, and in a further embodiment, are considered if at least one prior year tax return 450*b* is the most recent prior year tax return, or year before the year for which the current tax return is being prepared (e.g., prior year return is for 2012, before the current tax return for 2013). In a further embodiment, topic engine 413 initially only considers prior year tax returns 450*b* of consecutive years and filters out other prior year tax returns 450*b*. Thus, for example, if topic engine 413 received prior year tax returns 450*b* for 2013, 2012, 2010, 2009, 2007, topic engine 413 may proceed with initial filtering the 2010, 2009 and 2007 returns since they are not consecutive year returns, and none of these filtered returns is the most recent prior year return. In the event that multiple prior year returns 450*b* are received, but none are for consecutive years, topic engine 413 may begin with identifying topics of the most recent return 450*b* as a default. Further, if no prior year return 450*b* is the most recent prior year return, topic engine 413 may begin with analyzing topics of the most recent return 450*b* or most recent consecutive returns 450*b* (e.g., if a return for the most recent tax year was not filed or is not available from a source). Taxpayer or user can also select one or more prior year returns 450*b* that are utilized for topic analysis, and user selected returns may or may not be consecutive or the most recent returns.

At 1208, questions identified from prior year returns 450*b* based on pre-determined section criteria are provided by topic engine 413 to rule engine 412 of TLA 410, and at 1210, TLA 410 generates one or more non-binding suggestions 411. TLA 410 may generate a first non-binding suggestion 111 based at least in part upon a first question 413*q* of topic engine 413 output, and a second non-binding suggestion 111 based at least in part upon a second question or topic 413*q* of topic engine 413 output, and so on. TLA 410 may also generate one or more non-binding suggestions 111 based at least in part upon analysis of runtime data 442 in cache 414 and rules 462 of decision table 460 as described above with reference to FIGS. 4-10. At 1212, following TLA 410 generating one or more non-binding suggestions 111, UI controller 430, calculation engine 480 and shared data store 440 as described above with reference to FIGS. 4-10 is iteratively repeated as runtime data 442 is updated.

Figure 13:
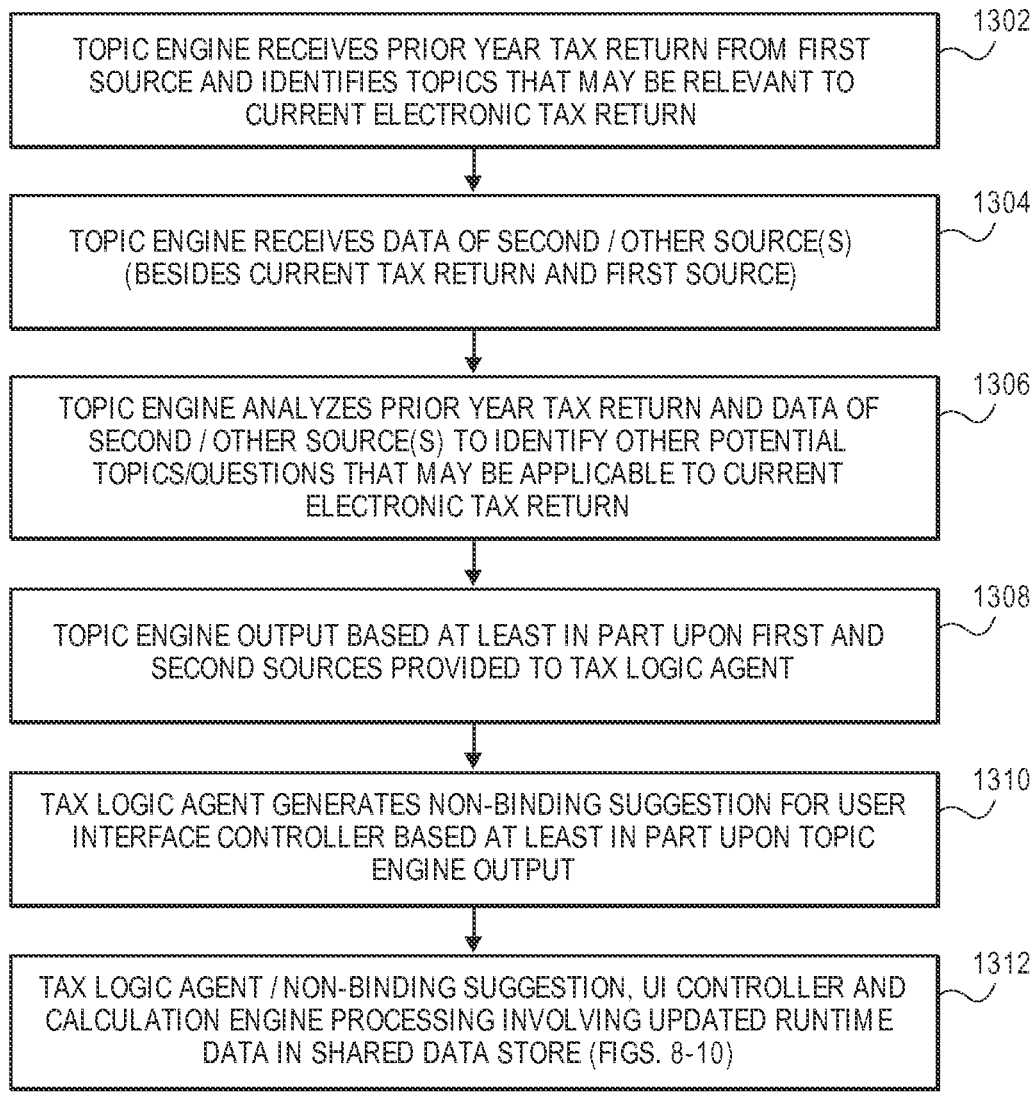
FIG. 13 is flow diagram of a computer-implemented method for identifying potential tax topics or questions for a current electronic tax return being prepared based on a prior year tax return and second data that is not from the prior year tax return.
Figure 14:
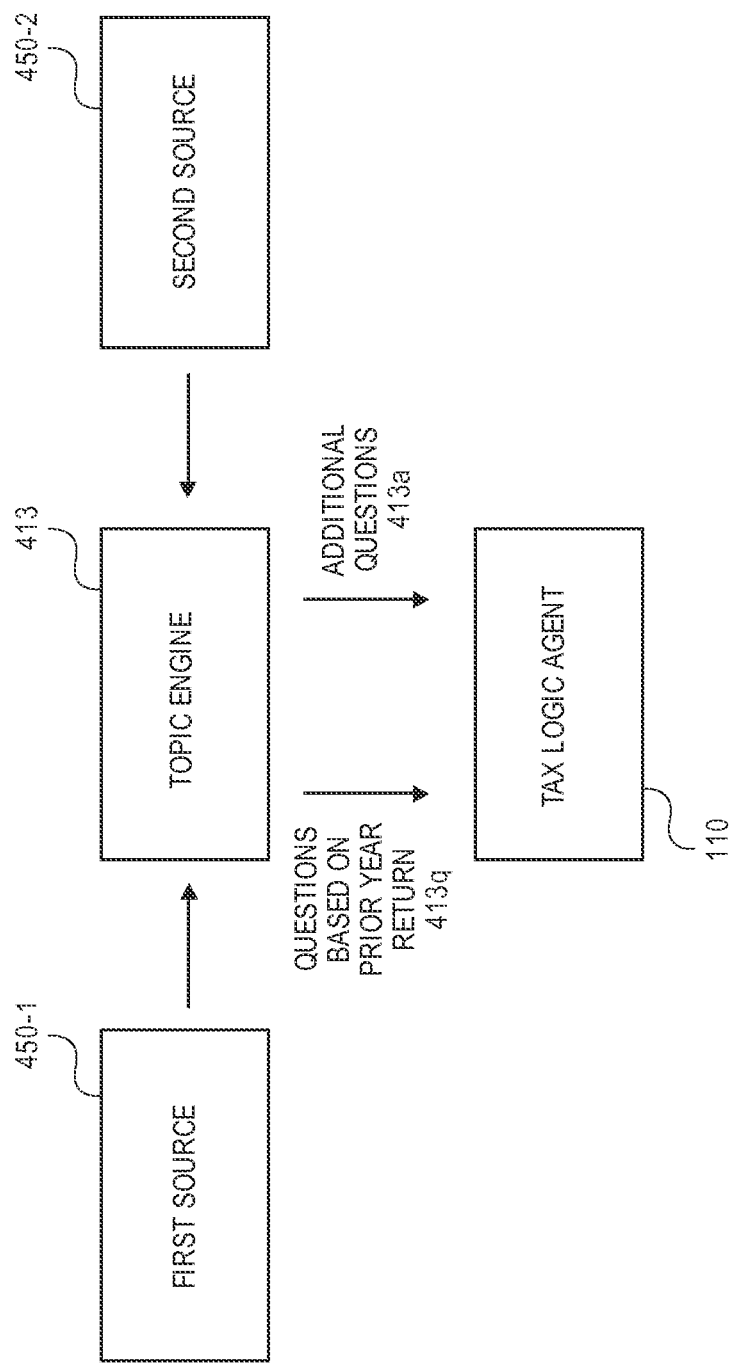
FIG. 14 is a system flow diagram illustrating how topics or questions of a prior year tax return and additional topics or questions not addressed in the prior year tax return are selected for a current electronic tax return.
Figure 15:
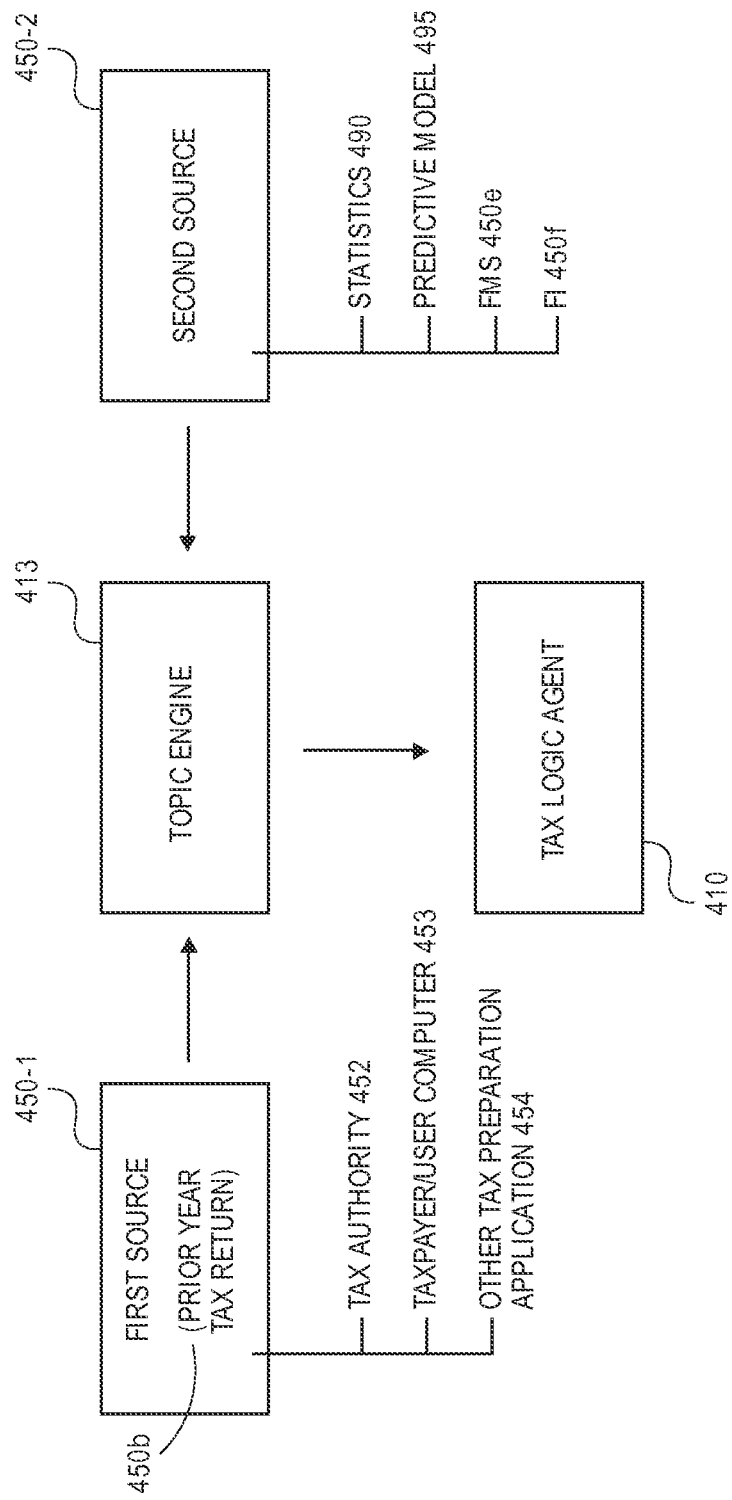
FIG. 15 is a system flow diagram illustrating how topics or questions of a prior year tax return and additional topics or questions not addressed in the prior year tax return are selected for a current electronic tax return and specific examples of sources of a prior year electronic tax return and sources of other data utilized to identify additional topics or questions.

Referring to FIG. 13, and with further reference to FIGS. 14-15, in another embodiment, at 1302, topic engine 413 receives a prior year tax return 450b from at least one source 450, e.g., a first source 450-1, and identifies questions that may be relevant to the current electronic tax return as discussed above. At 1304, topic engine 413 receives data of second/other source(s) 450-2 (that is not the current tax return, not the first source 450-1, and not a source that provides a prior year tax return 450b to topic engine 413). For example, second/other source 450-2 may be various sources 450 discussed above with reference to FIG. 4 such as statistical data 490 of other taxpayers, predictive models 495 such as logistic regression, naive bayes, K-means clustering, clustering, k-nearest neighbor, and neural networks (which may be configured to receive as inputs data of the current electronic tax return and generate outputs of potential topics).

For example, statistical data 490 may indicate that taxpayers that are married have a certain percentage likelihood of owning a home, a certain percentage likelihood of having one or more children, and a certain percentage likelihood of having deductions associated with childcare.

At 1306, topic engine 413 analyzes data of second/other source(s) 450-2 to identify other potential topics/questions that may be applicable to current electronic tax return given prior year tax return 450b data and/or current year tax return data, and at 1308, generates an output based at least in part upon the analysis of first and second source 450-1, 450-2 data. According to embodiments, topic engine 413 output may identify questions 413q of a prior year return 450b or consecutive prior year returns 450b, and one or more new or additional questions 413a ("a" referring to "additional") that were not addressed in prior year tax returns 450b, but are determined by topic engine 413 to be possible candidate questions in view of the second source data 450b such as statistical data 490 and/or predictive model 495 outputs. Thus, topic engine 413 can identify new, additional questions 413a that were not applicable in prior tax years.

If needed, terms of new or additional questions 413a or source 450 thereof can be mapped to schema 446 terms as needed so that questions 413q and 413a generated by topic engine 413 are consistent with terms of schema 446, decision table 460 and completeness graph 465, and which provides for seamless TLA 410 and UI controller 430 processing of non-binding suggestions 111.

For example, topic engine 413 may detect a life event that occurred during the year current tax return is being prepared and that was not applicable in prior tax years. A life event may be, for example, detected based on a second/other source 450-2 of data comprising an account taxpayer has with a FMS 450e such as MINT, QUICKEN and QUICK-BOOKS financial management systems and/or an account taxpayer has with a FI 450f and which may involve credit card purchases, debit card purchases and checks. Transaction data of these accounts may indicate a merchant, a category of spending (e.g., office supplies, baby products, jewelry) and/or item-level or Level III data such as (copy machine, computers, diapers, ring). This data can be utilized to detect a life event which, in turn, is utilized by topic engine 413 to identify questions 413q related to the detected life event and provide such output to TLA 410 for generation of a non-binding suggestion 111 at 1310. At 1312, TLA 410/non-binding suggestion 411, UI controller 430 and calculation engine 480 processing involving updated runtime data 442 in shared data store 440 as discussed above is repeated as runtime data 442 is updated.

For example, prior year tax return 450b data may indicate that taxpayers are married, ages 35-40, own a house (as reflected by mortgage interest deductions), but do not have children. Statistical data 490 of a second/other source 450-2 may indicate, that it is likely that other taxpayers that are homeowners and 35-40 years old also have children. Based on the statistical data 490 analysis that is based on prior year tax return 450b data, topic engine 413 generates an output identifying questions 413a involving "children" as new questions to address (such as dependent deduction, child care, medical expenses, etc.), even though these questions 413a were not applicable in prior year tax returns 450b and were not identified by the taxpayer or user. These new questions 413a can be the subject of non-binding suggestions 111 generated by TLA 410 and provided to UI controller 430. If these new questions 413a apply, they can be addressed by the taxpayers in the current electronic tax return being prepared. If not, embodiments nevertheless identified additional questions 413a to provide for a more comprehensive and personalized tax return preparation experience.

As another example, transaction data of an account with a FMS 450e or a FI 450f can be analyzed as describe in U.S. application Ser. No. 13/192,294, entitled LIFE EVENT DETECTION BASED ON ELECTRONIC TRANSACTION DATA, the contents of which are incorporated herein by reference as thought set forth in full. Examples of life events include a change of marital status, a change of a number of dependents, and purchase of a residence. Thus, a prior year tax return 450b may have indicated that taxpayer was single, or that joint taxpayers were married with no children, and topic engine 413 analyzed FMS 450e and/or FI 450f transaction data to determine that taxpayer(s) were purchasing items categorized as "baby products" or specific items such as "diapers" every month. Based on this data, topic engine 413 determines that taxpayer(s) experienced a life event the following year. Thus, a prior year tax return 450b would have indicated that taxpayers were married with no dependents, and topic engine 413 identifies questions 413a involving "children" as new topics to address (such as dependent deduction, child care, medical expenses, etc.), which were not the subject of prior year tax returns. These new topics or questions 413a can be the subject of non-binding suggestions 111 generated by TLA 410 and provided to UI controller 430. If these new questions 413a apply, they can be addressed by the taxpayers in the current electronic tax return being prepared. If not, embodiments nevertheless identified relevant topics to provide for a more comprehensive and personalized tax return preparation experience.

Figure 16:
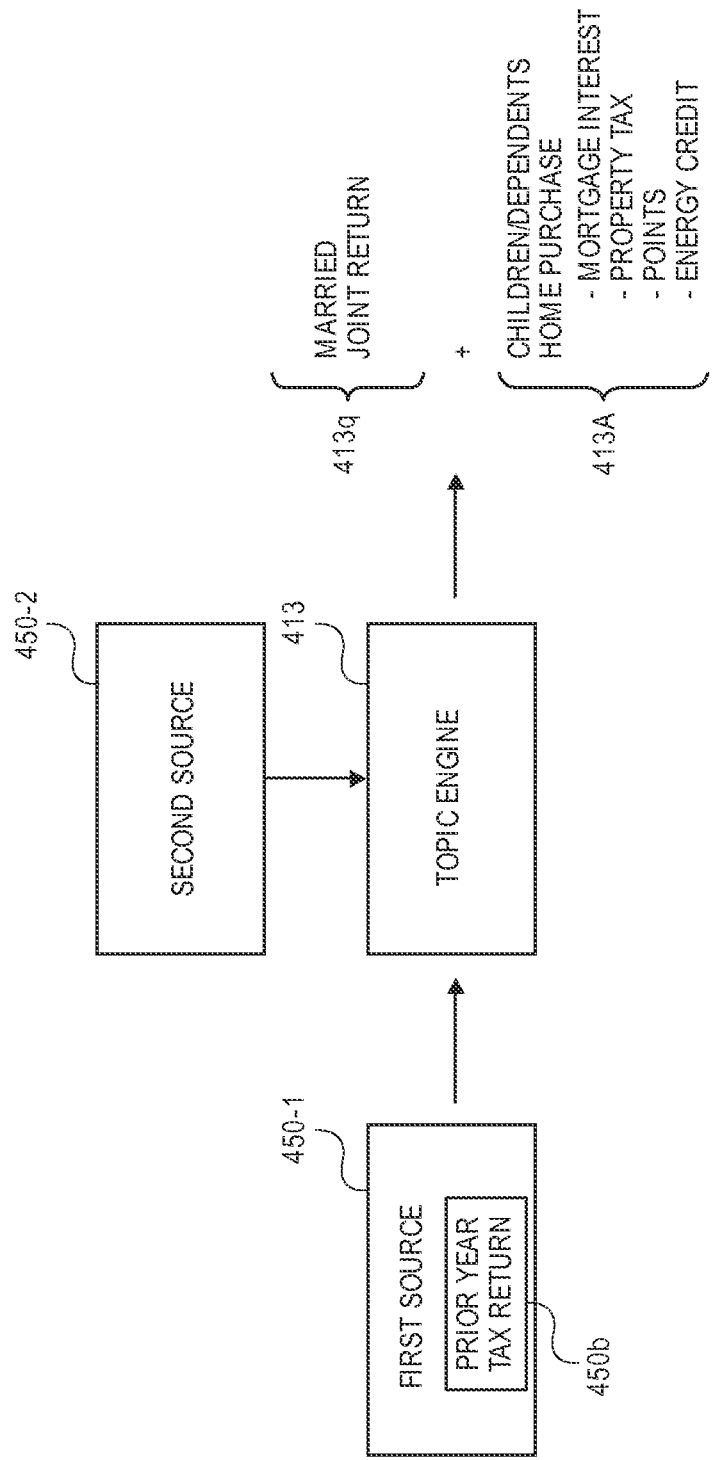
FIG. 16 is a system flow diagram illustrating a particular example of how topics or questions of a prior year tax return involving marital status of taxpayers and additional topics or questions involving dependents and home ownership that were not addressed in the prior year tax return are selected for a current electronic tax return.

FIG. 16 generally illustrates how a topic engine 413 can output new questions that were not previously addressed in prior year tax returns 450b based on analysis of second/other source 450-2 data given prior year tax return data, with the example of prior year tax return 450b data indicating taxpayers were married during the prior tax year, and new topics that did not apply during the prior tax year (e.g., children/dependent related topics, home ownership related topics) being identified by topic engine and provided to TLA 410.

Figure 17:
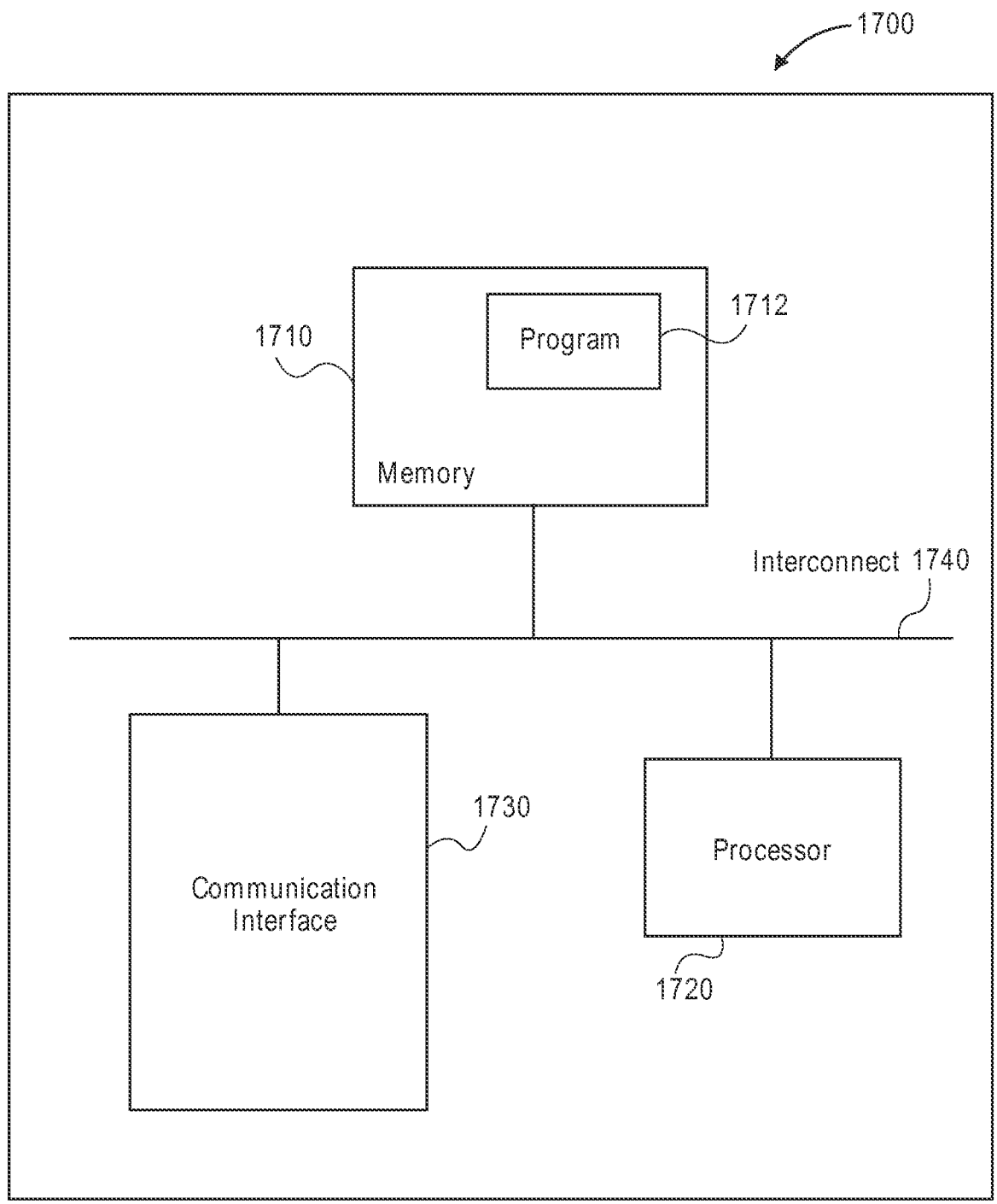
FIG. 17 is a block diagram of components of a computer system that may be programmed or configured to execute embodiments

FIG. 17 generally illustrates certain components of a computing device 2400 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process a-s well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method, comprising:
a computing system, by a processor executing computer-executable instructions of a user interface controller of a computerized tax return preparation application stored in a non-transitory storage medium utilized by the computing system, presenting a first computer-generated interview screen through a display of the computing system, receiving a first user response through the first computer-generated interview screen, and writing the first user response to a shared data store to update first data of the current electronic tax return being prepared and currently stored in the shared data store and to generate second data of the current electronic tax return and;
the computing system, by the processor executing computer-readable instructions of a calculation engine of the computerized tax return preparation application that is in communication with the shared data store, reading the second data of the current electronic tax return from the shared data store as updated by the user interface controller, executing rules of a graphical data structure a first time using the second data, and writing a result of executing the rules of the graphical data structure the first time to the shared data store to update the second data of the current electronic tax return and generate third data of the current electronic tax return;
the computing system, by the processor executing computer-readable instructions of a logic agent of the computerized tax return that is in communication with the user interface controller and the shared data store, reading the third data of the current electronic tax return from the shared data store, eliminating potential candidate questions from a completion graph structure using the third data, and identifying candidate questions to present to the user from the completion graph structure, wherein logic utilized by the logic agent to identify candidate questions is independent of and not programmed within computer-generated interview screens of the user interface controller of the computerized tax return preparation application;
the computing system, by the processor executing computer-readable instructions of a topic engine of or utilized by the logic agent and in communication with a first electronic source and a second electronic source different from the first source, receiving electronic data of a prior year tax return from the first electronic source, receiving electronic data of the second source different from the prior year tax return, and generating an output comprising a predicted topic that was not addressed in the prior year tax return and applicable to the current electronic tax return based at least in part upon respective electronic data received from the first source and the second source and the third data of the current electronic tax return;
the computing system, by the logic agent, receiving the topic engine output and generating a first non-binding suggestion based at least in part upon the topic engine output and outputting the non-binding suggestion to the user interface controller, wherein the first non-binding suggestion generated based at least in part upon the topic engine output identifies a topic that was not addressed in the prior year tax return; and the computing system, by the user interface controller, receiving the first non-binding suggestion from the logic agent, executing at least one configuration file to determine processing of the first non-binding suggestion, presenting a second computer-generated interview screen through the display, receiving a second user response through the second computer-generated interview screen, and writing the second user response to the shared data store to update the third data of the current electronic tax return and generate fourth data of the current electronic tax return;

the computing system, by the processor executing the calculation engine, reading the fourth data of the current electronic tax return from the shared data store as updated by the user interface controller, executing the rules of the graphical data structure a second time using the fourth data, and writing a result of executing the rules of the graphical data structure the second time to update the fourth data of the current electronic tax return and generate fifth data of the current electronic tax return.

2. The computer-implemented method of claim 1, the first electronic source comprising a computing device of a preparer of the current tax return for the taxpayer, an electronic copy of the prior year tax return being locally stored on the computing device.

3. The computer-implemented method of claim 1, the first electronic source comprising a computer of a tax authority with which the prior year tax return was filed.

4. The computer-implemented method of claim 1, the first electronic source comprising a computerized tax return preparation application utilized to prepare the prior year tax return.

5. The computer-implemented method of claim 4, further comprising the topic engine:
   requesting credentials to access a computerized tax return preparation application utilized to prepare the prior year tax return;
   receiving the credentials from a user of the computerized tax return preparation application;
   accessing the computerized tax return preparation application utilizing the credentials; and
   retrieving the prior year tax return that was prepared utilizing the computerized tax return preparation application.

6. The computer-implemented method of claim 1, the second electronic source comprising an electronic source of statistical data, the topic engine identifying topics addressed in the prior year tax return, and
   identifying additional possible topics that were not included in the prior year tax return based at least in part upon statistical data associated with one or more identified topics of the prior year tax return.

7. The computer-implemented method of claim 1, the second electronic source comprising a computer-executable predictive model, the topic engine identifying topics addressed in the prior year tax return, and
   identifying additional possible topics that were not addressed in the prior year electronic tax return based at least in part upon the an output generated by the computer-executable predictive model associated with one or more identified topics of the prior year tax return.

8. The computer-implemented method of claim 7, the computer-executable predictive model being selected from the group consisting of: logistic regression, naive bayes, K-means clustering, clustering, k-nearest neighbor, and neural networks.

9. The computer-implemented method of claim 1, the logic agent generating at least one non-binding suggestion based at least in part upon analysis of the logic relative to the runtime data but not the topic engine output.

10. The computer implemented method of claim 1, the logic agent analyzing the logic relative to the runtime data and generating a non-binding suggestion based at least in part upon analysis of the logic relative to the runtime data.

11. The computer-implemented method of claim 10, the nonbinding suggestion being based on the topic engine output and analysis of the logic.

12. The computer-implemented method of claim 1, the nonbinding suggestion being based at least in part upon the topic engine output comprising multiple tax topics.

13. The computer-implemented method of claim 1, the logic agent
    generating a first non-binding suggestion based at least in part upon a first topic of the topic engine output; and
    generating a second non-binding suggestion based at least in part upon a second topic of the topic engine output.

14. The computer-implemented method of claim 1, the nonbinding suggestion being generated based at least in part upon the topic engine output identifying a tax form that was not part of the prior year tax return.

15. The computer-implemented method of claim 1, the nonbinding suggestion being generated based at least in part upon the topic engine output indicating a taxpayer life event that was not part of the prior year tax return.

16. The computer-implemented method of claim 15, the second electronic source comprising an account the taxpayer has with a financial institution, the topic engine analyzing electronic transaction data of the account and identify the taxpayer life event.

17. The computer-implemented method of claim 15, the second electronic source comprising an account the taxpayer has with a computerized financial management system that receives data of respective electronic accounts the taxpayer has with respective financial institutions through respective networks, the topic engine analyzing electronic transaction data of the electronic account and identifying the taxpayer life event.

18. The computer-implemented method of claim 15, the second electronic source comprising a source of statistical data, the topic engine identifying the taxpayer life event based at least in part upon data of the prior year tax return and statistical data of other taxpayers.

19. The computer-implemented method of claim 15, the second electronic source comprising a predictive model, the topic engine identifying the taxpayer life event based at least in part upon a computer-executable predictive model receiving inputs comprising pre-determined types of data of the prior year tax return, the computer-executable predictive model output identifying the life event.

20. The computer-implemented method of claim 15, the life event being selected from the group consisting of: a change of marital status, a change of a number of dependents, and purchase of a residence.

21. The computer-implemented method of claim 15, a tax topic identified by the topic engine output involving birth of a child, wherein the prior year tax return indicated that the taxpayer had no children.

22. The computer-implemented method of claim 21, wherein the tax topic identified by the topic engine is based at least in part upon the prior year tax return being a joint tax return indicating that a first taxpayer and a second taxpayer were married.

23. The computer-implemented of claim 15, a tax topic identified by the topic engine involving deductions for at least one of mortgage interest, points and property taxes associated with owning or purchasing of a property, wherein the prior year tax return was a joint tax return and indicated no property ownership.

24. The computer-implemented method of claim 23, wherein the tax topic identified by the topic engine is based at least in part upon the prior year tax return including deductions for a child.

25. The computer-implemented method of claim 1, wherein the prior year tax return was filed with a tax authority.

26. The computer-implemented method of claim 1, wherein the prior year tax return was not filed with a tax authority.

27. The computer-implemented method of claim 1, wherein the prior year tax return is incomplete.

28. The computer-implemented method of claim 1, the topic engine
receiving a first prior year tax return and a second prior year tax return, and identifying a topic that was addressed in the second prior year tax return but not addressed in the first prior tax return,
the non-binding suggestion being based at least in part upon the identified topic addressed in the second prior year tax return.

29. The computer-implemented method of claim 1, the user interface controller determining whether and when to process the non-binding suggestion provided by the logic agent based on execution of the configuration file.

30. The computer-implemented method of claim 1, the user interface controller, determining whether to process the non-binding suggestion based on execution of the configuration file.

31. The computer-implemented method of claim 1, further comprising the calculation engine populating the graphical data structure comprising a directed calculation graph with the second data.

32. The computer-implemented method of claim 31, the directed calculation graph comprising a plurality of nodes comprising:

input or leaf nodes comprising data for specific tax-related items, wherein the input or leaf nodes are populated with respective second data read from the shared data store;

function nodes associated with respective functions, wherein respective input nodes are associated with respective function nodes, and inputs to a function include data of respective associated input nodes; and result nodes associated with respective functions nodes, a result node comprising an output generated by function associated with a function node.

33. The computer-implemented method of claim 1, wherein the topic engine is also a component of or utilized by the user interface controller and shared by the logic agent and the user interface controller.

34. The computer-implemented method of claim 33, the user interface controller storing data of the prior year tax return of the first source to the shared data store with associated first source tags, and storing data of the second source to the shared data store with associated second source tags, wherein when the logic agent reads runtime data from the shared data store, and identifies tagged data and generates a non-binding suggestion based at least in part upon tagged data.

35. The computer-implemented method of claim 1, wherein the topic engine is a component of the tax logic agent.

36. The computer-implemented method of claim 1, the first electronic source comprising a computing device of the user, an electronic copy of the prior year tax return being locally stored on the computing device.

37. The computer-implemented method of claim 1, wherein the computer-implemented method is executed utilizing the computing system comprising a distributed computing system of modular computing system components, and wherein the shared data store, the user interface controller, the calculation engine, the logic agent and the topic engine are modular computing components executed by respective computers of the distributed computing system and in communication with each other through respective communication networks.

* * * * *